United States Patent
Hafter et al.

(10) Patent No.: US 12,483,187 B2
(45) Date of Patent: Nov. 25, 2025

(54) METHODS AND SYSTEMS FOR REINFORCED MOUNTING HOLES FOR SOLAR PANEL FRAMES

(71) Applicant: Origami Solar, Inc., Sacramento, CA (US)

(72) Inventors: Eric L. Hafter, Sacramento, CA (US); John C. Patton, Rocklin, CA (US)

(73) Assignee: Origami Solar, Inc., Sacramento, CA (US)

( * ) Notice: Subject to any disclaimer, the term of this patent is extended or adjusted under 35 U.S.C. 154(b) by 0 days.

(21) Appl. No.: 18/561,263

(22) PCT Filed: May 17, 2022

(86) PCT No.: PCT/US2022/029668
§ 371 (c)(1),
(2) Date: Nov. 15, 2023

(87) PCT Pub. No.: WO2022/245852
PCT Pub. Date: Nov. 24, 2022

(65) Prior Publication Data
US 2024/0258964 A1    Aug. 1, 2024

Related U.S. Application Data

(60) Provisional application No. 63/189,591, filed on May 17, 2021.

(51) Int. Cl.
*H02S 30/10* (2014.01)
(52) U.S. Cl.
CPC .................................. *H02S 30/10* (2014.12)
(58) Field of Classification Search
None
See application file for complete search history.

(56) References Cited

U.S. PATENT DOCUMENTS

| 10,590,653 B1 * | 3/2020 | Lambach ............ E04D 13/1625 |
| 2011/0260027 A1 * | 10/2011 | Farnham, Jr. ........... F24S 25/35 |
| | | 248/309.1 |

(Continued)

FOREIGN PATENT DOCUMENTS

| CN | 117716096 A | 3/2024 |
| WO | 2013084843 A1 | 6/2013 |

(Continued)

OTHER PUBLICATIONS

International PCT Patent Application No. PCT/US2022/029668 filed May 17, 2022. First named inventor: Hafter.

(Continued)

*Primary Examiner* — Steven M Marsh

(57) ABSTRACT

A frame (101) for supporting a solar panel (190) may include at least a first frame section (201-1), having a bottom flange (604) provided at a base of the first frame section (601) and a frame sidewall (603). A panel containment structure (191), at an upper portion of the frame sidewall, may have a lower shelf (105) extending from the sidewall (603). One or more reinforced mounting holes (822) may be provided in the bottom flange (804), in the frame sidewall (903), or both in the bottom flange and in the frame sidewall. The bottom flange, frame sidewall. (10) and panel containment structure may be formed at least in part from folds (102) provided in a single piece of first framework material, the first framework material having an average thickness. One or more reinforced mounting holes may include an opening having a depth greater than the framework thickness.

23 Claims, 30 Drawing Sheets

(56) References Cited

U.S. PATENT DOCUMENTS

| | | | |
|---|---|---|---|
| 2013/0102165 A1 | 4/2013 | DuPont | |
| 2014/0137927 A1 | 5/2014 | Kim et al. | |
| 2017/0104445 A1 | 4/2017 | DePauw | |
| 2018/0367087 A1* | 12/2018 | Ayers | H02S 40/425 |
| 2019/0190437 A1* | 6/2019 | Kobayashi | F24S 25/65 |
| 2021/0242820 A1* | 8/2021 | Ayers | H02S 40/22 |
| 2022/0173691 A1* | 6/2022 | Atchley | H02S 30/00 |
| 2023/0155542 A1* | 5/2023 | Loewenstern | H02S 40/10 |
| | | | 136/251 |

FOREIGN PATENT DOCUMENTS

| | | |
|---|---|---|
| WO | 2020252091 A1 | 12/2020 |
| WO | 2022245852 A2 | 11/2022 |

OTHER PUBLICATIONS

International PCT Patent Application No. PCT/US2022/029668 filed May 17, 2022. First named inventor: Hafter. Written Opinion of the International Searching Authority dated Oct. 19, 2022. 12 pages.

International PCT Patent Application No. PCT/US2022/029668 filed May 17, 2022. First named inventor: Hafter. International Search Report dated Oct. 19, 2022. 5 pages.

U.S. Appl. No. 63/189,591, filed May 17, 2021. First named inventor: Hafter.

Counterpart European Application No. 22805 337.7, filed Nov. 16, 2023. First named inventor: Hafter. Examination Search Report dated Mar. 25, 2025, 9 pages.

* cited by examiner

1223D

1223E

1223F

1223G

METHODS AND SYSTEMS FOR REINFORCED MOUNTING HOLES FOR SOLAR PANEL FRAMES

CROSS-REFERENCE TO RELATED APPLICATION

This application is a PCT International Application claiming priority to and the benefit of U.S. Provisional Patent Application No. 63/189,591 filed on May 17, 2021, entitled "METHODS AND SYSTEMS FOR REINFORCED MOUNTING HOLES FOR SOLAR PANEL FRAMES", the contents of which are hereby incorporated by reference in their entirety.

TECHNICAL FIELD

The present disclosure relates to various embodiments for frame structures for panels such as solar panels. One or more reinforced mounting holes may be provided in a frame structure such as in a bottom flange, in a frame sidewall, or even both in the bottom flange and in the frame sidewall.

BACKGROUND

Photovoltaic solar panels for residential and commercial use are relatively large and heavy. For example, a typical rectangular solar panel may weigh about 20-30 kg, have a width of about 1 meter, a length of about 1.6 to 2.5 meters, and a thickness of about 3 to 5 cm. A photovoltaic solar panel may typically be a multilayer laminated structure and may include photovoltaic cells encapsulated between a top glass and a protective back-sheet. A solar panel can further include appropriate wiring and junctions so that solar-generated electricity (typically DC) may be transmitted to a desired load, grid, or energy storage unit. While having some physical toughness, significant additional strength to the panel may be provided by including it in a frame. A frame may allow for easy attaching of a photovoltaic solar panel to a rack. A framed PV laminate may be referred to as a PV module.

Over the years, the cost of solar panels has decreased perhaps due to a decrease in the material and manufacturing costs and even an increased efficiency of the solar cells. However, in order to further expand the use of renewable solar energy, there is a continuing desire to improve solar panel frames and how they connect to racking.

DISCLOSURE OF INVENTION

The present application includes a variety of aspects, which may be selected in different combinations based upon the particular application or needs to be addressed. In various embodiments, the application may include a frame for supporting a solar panel. The frame may include at least a first frame section. The first frame section may include a bottom flange provided at a base of the first frame section and a frame sidewall provided at an outer portion of the first frame section, the frame sidewall having a height extending from the bottom flange. A panel containment structure may be provided at an upper portion of the frame sidewall, the panel containment structure having a lower shelf extending from the sidewall. One or more reinforced mounting holes may be provided in the bottom flange, in the frame sidewall, or even both in the bottom flange and in the frame sidewall. The bottom flange, frame sidewall, and panel containment structure may be formed at least in part from folds provided in a single piece of first framework material, the first framework material having an average thickness. One or more reinforced mounting holes may include an opening having a depth greater than the framework thickness.

It may be an object of the application to provide improved attachment of framed panel structures to racking.

Another object of the application may include improved mounting structures.

Yet another object of the application may include improved options for high-strength modules.

An object of the application may include frames, frame sections, and frame precursor structures with improved bending, improved twisting, and even improved durability of framed panel structures.

Another object of the application may include frames, frame sections, and frame precursor structures with reduced material costs, reduced manufacturing costs, reduced manufacturing tack time, and perhaps even higher manufacturing yield.

In yet other objects, the application may provide frames, frame sections, and frame precursor structures with reduced installation costs, simplified installation, reduced installation time, higher installation yield, or some other advantage.

Naturally, further objects, goals and embodiments of the application are disclosed throughout other areas of the specification, claims, and drawings.

MODE(S) FOR CARRYING OUT THE INVENTION

It should be understood that embodiments include a variety of aspects, which may be combined in different ways. The following descriptions are provided to list elements and describe some of the embodiments of the present application. These elements are listed with initial embodiments; however, it should be understood that they may be combined in any manner and in any number to create additional embodiments. The variously described examples and embodiments should not be construed to limit embodiments of the present application to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

It is to be understood that the drawings are for purposes of illustrating the concepts of the disclosure and may not be to scale. Additional details of certain embodiments of the present application may be found in PCT application PCT/US2020/037092 filed on Jun. 10, 2020 and published as WO2020/252091A1, PCT application PCT/US2022/025383 filed on Apr. 19, 2022, PCT application PCT/US2022/025388 filed on Apr. 19, 2022, U.S. provisional application 63/213,541 filed Jun. 22, 2021, U.S. provisional application 63/224,271 filed Jul. 21, 2021, and U.S. provisional application 63/272,086 filed Oct. 26, 2021, the entire contents of each application are incorporated herein by reference for all purposes.

Figure 1A:
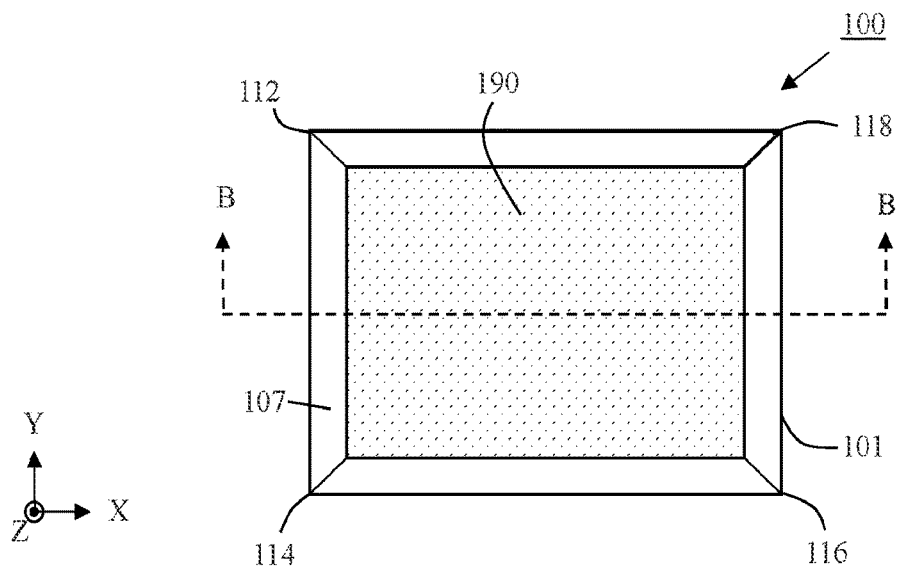
FIG. 1A is a plan view of a non-limiting example of a framed panel structure according to some embodiments.
Figure 1B:
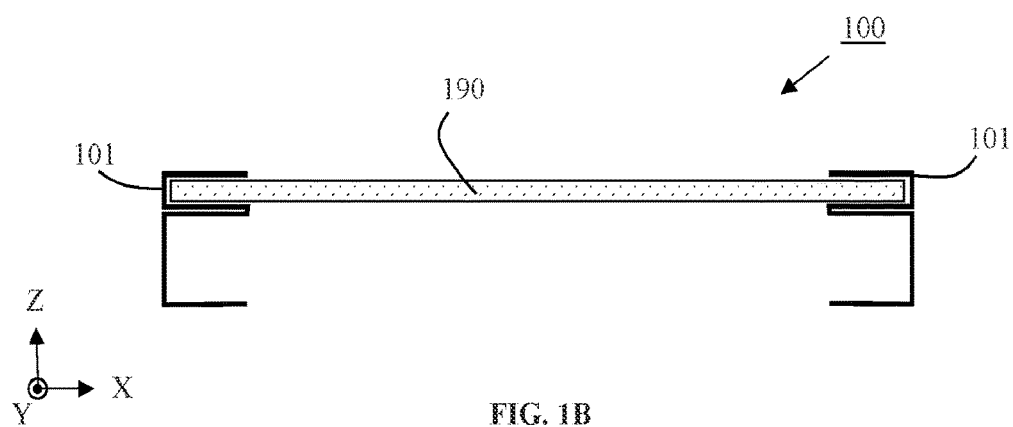
FIG. 1B is a cross-sectional view of a non-limiting example of a framed panel structure along cutline B-B of FIG. 1A according to some embodiments.
Figure 1C:
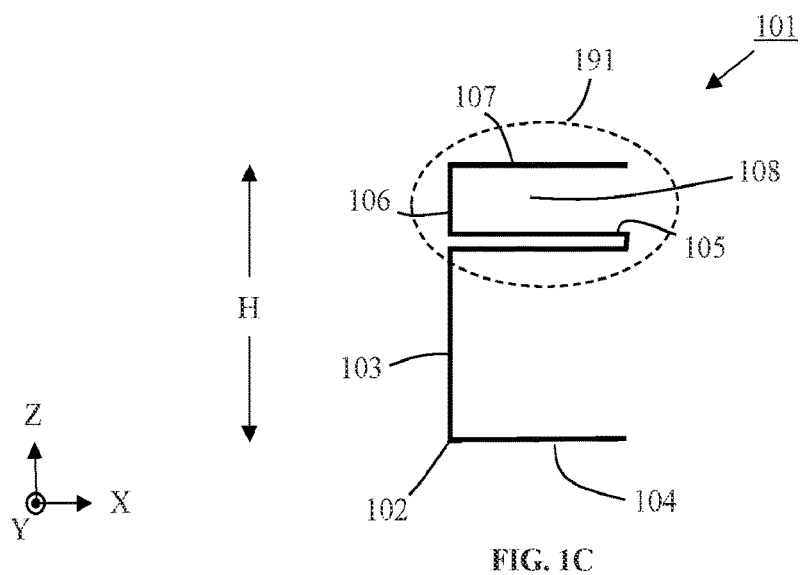
FIG. 1C is the cross-sectional view from FIG. 1B showing a non-limiting example of just the frame according to some embodiments.

FIG. 1A is a plan view of a non-limiting example of a framed panel structure 100 (e.g., a framed solar panel structure or PV module) including panel 190 (e.g., a solar panel) encased in a frame 101 according to some embodiments. FIG. 1B is a cross-sectional view of the framed panel structure 100 along cutline B-B. For added perspective, XYZ coordinate axes are also shown. FIG. 1C is the cross-sectional view as in FIG. 1B but excluding the panel to further illustrate some of the features of the frame 101.

In some embodiments and as discussed in more detail herein, frame 101 may be formed from substantially a single frame precursor structure that can be bent in predetermined regions to accommodate three corners of the solar panel, perhaps with the fourth corner forming a joint between two ends of the frame precursor structure. That is, frame 101 may in some cases include a first corner bend 112 corresponding to a first corner of panel 190, a second corner bend 114 corresponding to a second corner of panel 190, a third corner bend 116 corresponding to a third corner of panel 190, and even a corner joint 118 corresponding to a fourth corner of panel 190.

Referring to FIGS. 1B and 1C, frame 101 may include a framework material that has been cut and folded into a desired shape. Frame 101 may be characterized by a height H and may include a lengthwise fold 102 defining an intersection of a frame sidewall 103 with a bottom flange 104. The frame may further include a series of folds to form a panel containment structure 191 including a lower shelf 105, a pocket wall 106, a top lip 107, and perhaps even a pocket region 108. In some embodiments, the bottom flange may generally represent, or be provided at, the base of the frame or framed panel structure. The panel 190 may be received onto the lower shelf, e.g., into a portion of the pocket region and secured in place, optionally with a sealant that may have adhesive properties (not shown). Some non-limiting examples of sealants may include curable liquid silicone, urethane, epoxy, resin, any other liquid seal, or the like. Alternatively, or in combination, a pressure sensitive adhesive tape may optionally be used to secure the panel in the pocket region. In some embodiments, a panel containment structure may include only a lower shelf, or alternatively, only a lower shelf and a pocket wall. In such embodiments, the panel may optionally be secured in place using a sealant or pressure sensitive adhesive as described above. In some embodiments, only some of the frame sections may include a panel containment structure, for example, only frame sections on one set of opposing sides of a rectangular or square panel.

Although FIGS. 1B and 1C show non-limiting examples where the bottom flange, the lower shelf, and the top lip all extend away from the frame sidewall to an equal extent, any of these features may be varied such as shorter or longer than the others or the like. The angle between the frame sidewall and bottom flange is shown to be approximately 90°, e.g., in a range of about 85° to about 95°, but in some other embodiments, the angle may be outside of that range, e.g., in a range of about 45° to about 135° perhaps depending on other features of the structure and overall system design. In some embodiments, the lower shelf and bottom flange may remain approximately parallel, e.g., within about 40°, alternatively within about 30°, about 20°, about 15°, about 10°, or even about 5°, regardless of the angle between the frame sidewall and the bottom flange. The top lip is shown to be parallel with the lower shelf, but in some embodiments, it may be at a slight angle or curved at the end perhaps so that the opening of the pocket region may be larger or smaller than the pocket wall. In the embodiment illustrated in FIGS. 1B and 1C, the lower shelf 105 is shown as being formed from, or including multiple layers of, framework material. In some embodiments, any or all of the frame features (e.g., the sidewall, bottom flange, lower shelf, pocket wall, upper lip, support wall, or the like) may be formed from or include multiple layers of framework material. In some cases, multiple layers may provide increased strength to the frame.

FIGS. 1A, 1B, and 1C illustrate a conventional rectangular panel shape that may be common for solar panels. However, there is no particular limitation on the shape of the panel which may be any shape such as polygon having 3, 4, 5, 6 7, 8 or more sides. The sides of the polygon may have the same length, or alternatively some sides may be longer or shorter. The corner angles of the polygon may all be the same, or alternatively, some corner angles may have smaller or larger angles than others. Although frames and frame sections herein are generally shown as having a bottom flange, in some embodiments, one or more frame sections may not include a bottom flange. In some embodiments where the frame has a rectangular shape, the frame sections corresponding to the shorter sides of the frame may not include a bottom flange whereas the frame sections corresponding to the longer sides of the frame may include a bottom flange.

Making the frame or a frame section substantially from a single piece of framework material may have considerable manufacturing, assembly, and cost advantages. However, the panel containment structure in some embodiments may be formed using alternative methods and materials. For example, the lower shelf may include a piece of shelf material bonded (e.g., welded, brazed, soldered, glued, riveted, or the like) to an upper portion of the frame sidewall. Similarly, the top lip may include a piece of top lip material bonded to the top of the frame structure. Alternatively, the entire panel containment structure may be a separate structure designed to sit on, slip over, or otherwise mate with the frame sidewall. As discussed elsewhere herein, rather than one elongated piece of framework material, a 4-sided frame may be formed from 2, 3, or even 4 separate frame sections (or more or if the frame has more than 4 sides).

Although not illustrated in FIGS. 1A-1C, the frame or framed panel structure may further include a support wall extending from the bottom flange to the panel containment structure or to the frame sidewall, as described in more detail elsewhere herein. It should be noted that, throughout this disclosure, an upper portion and top lip may in some cases refer to general positions relative to the bottom flange or the base of the frame, and does not necessarily indicate a position or orientation in the final framed panel structure, which may be oriented in a manner other than horizontal as shown in FIG. 1B (e.g., at an angle, on its side, or even parietally or fully inverted).

Figure 2A:
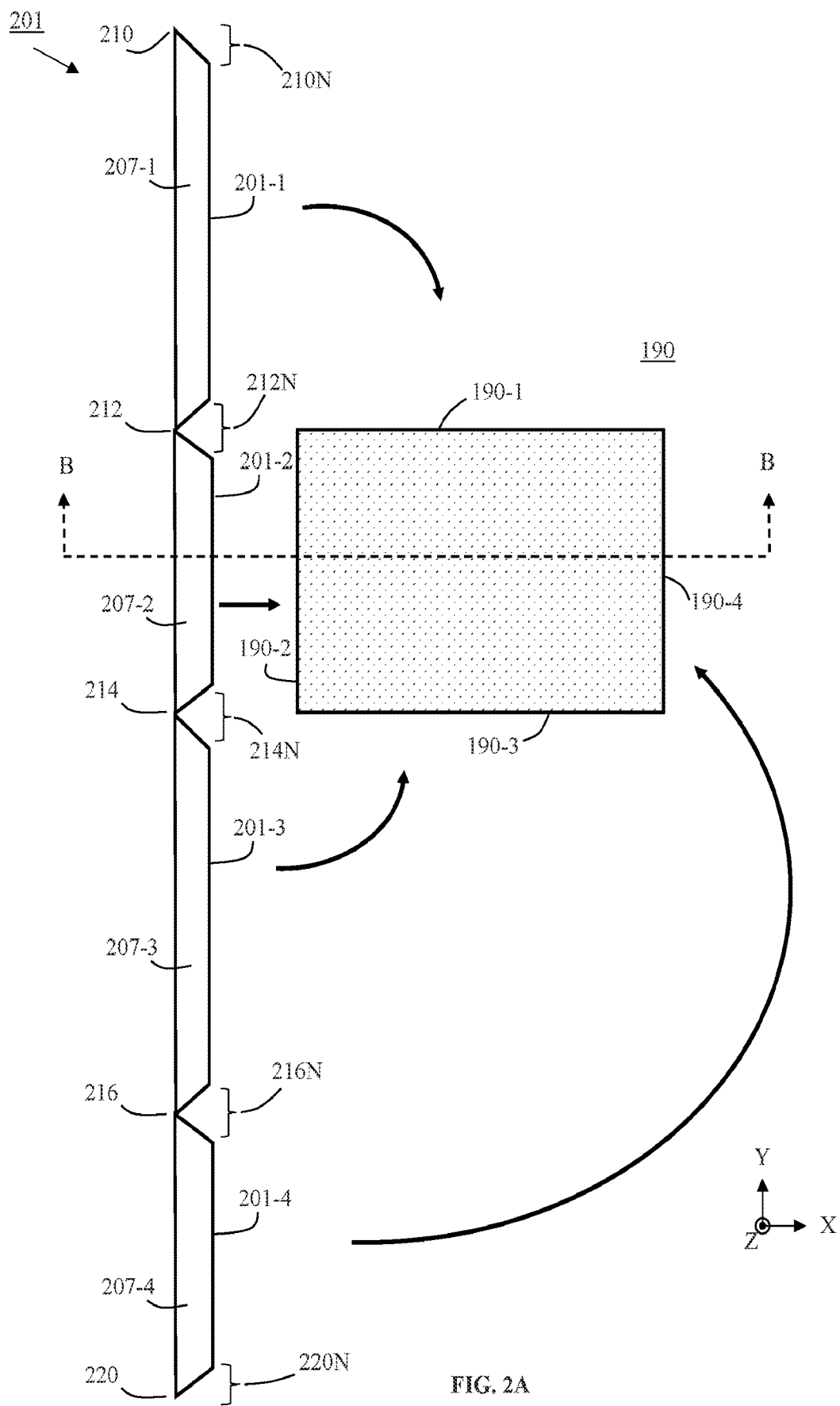
FIG. 2A is a plan view of a non-limiting example of a frame precursor structure and a panel prior to assembling a framed panel structure according to some embodiments.
Figure 2B:
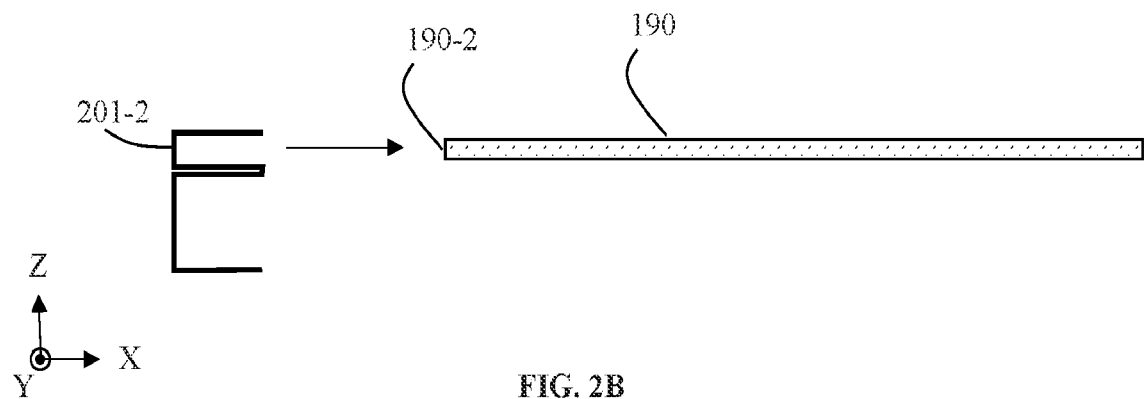
FIG. 2B is a cross-sectional view of a non-limiting example of a frame precursor structure and a panel along cutline B-B of FIG. 2A according to some embodiments.

FIG. 2A is a plan view schematic to generally illustrate construction of a framed panel structure according to some embodiments. FIG. 2B is a cross-sectional view of FIG. 2A along cutline B-B. A frame precursor structure 201 may be formed from framework material characterized by an average thickness. Frame precursor structure 201 may include a first end 210 and a second end 220 defining a lengthwise dimension. The frame precursor structure 201 may include a first frame section 201-1 designed to fit with or attach to first panel edge 190-1 of panel 190, a second frame section 201-2 designed to fit with or attach to second panel edge 190-2, a third frame section 201-3 designed to fit with or attach to third panel edge 190-3, and even a fourth frame section 201-4 designed to fit with or attach to fourth panel edge 190-4. Frame precursor structure 201 may include a first corner bend precursor axis 212 between the first and second frame sections and may be designed to bend along the Z axis (the height axis) of the frame sidewall. In a finished framed panel structure, first corner bend precursor axis 212 can correspond to first corner bend 112 (FIG. 1A). Similarly, frame precursor structure 201 may include second and third corner bend precursor axes 214 and 216, respectively.

Figure 2C:
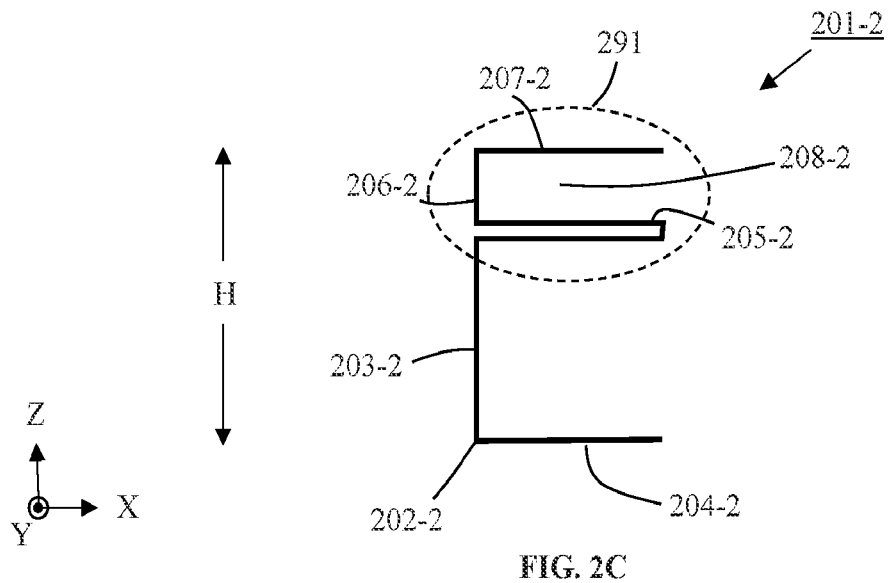
FIG. 2C is the cross-sectional view from FIG. 2B showing a non-limiting example of just the frame precursor structure according to some embodiments.

Referring to FIG. 2B, the cross-sectional structure correlates to that of FIG. 1B for the finished frame. FIG. 2C is the cross-sectional view as in FIG. 2B but excluding the panel to further illustrate some non-limiting examples of the features of the frame precursor structure, in particular, frame section 201-2. Here, second frame section 201-2 may be characterized by height H and may include a lengthwise fold 202-2 perhaps defining an intersection of a frame sidewall 203-2 with a bottom flange 204-2. The second frame section may include a series of folds to form a panel containment structure 291 including a lower shelf 205-2, a pocket wall 206-2, a top lip 207-2 and perhaps even a pocket region 208-2. In some embodiments, the bottom flange may generally represent, or be provided at, the base of the frame section. In some embodiments, a panel containment structure may include only a lower shelf, or alternatively, only a lower shelf and a pocket wall. Panel edge 190-2 of panel 190 may be received onto the lower shelf, e.g., into a portion of the pocket region and secured in place, optionally with some sealant (not shown). In some embodiments, each frame section of the frame precursor structure may have substantially the same cross-sectional structure as shown for the second frame section 201-2 in FIG. 2B. But in some other embodiments, there may be differences between cross-sectional structures of two or more of frame sections. In the embodiment illustrated in FIGS. 2B and 2C, the lower shelf 205-2 is shown as being formed from, or including multiple layers of, framework material. In some embodiments, any or all of the frame section features (e.g., the sidewall, bottom flange, lower shelf, pocket wall, upper lip, support wall, or the like) may be formed from or include multiple layers of framework material. In some cases, multiple layers may provide increased strength to the frame.

In order to accommodate bending, the frame precursor structure may include a series of notches (212N, 214N, 216N) in the top lip, the lower shelf, and even the bottom flange, such notches corresponding to first, second, and third corner bend precursor axes, 212, 214, and 216, respectively. In FIG. 2A, the notches are only visible in the top lip (between top lip 207-1 and top lip 207-2, between top lip 207-2 and top lip 207-3, and between top lip 207-3 and top lip 207-4), but similar notches may also be present perhaps in the lower shelf and bottom flange. In some embodiments, the angle of the notch may be about 180° minus the angle of the panel corner being enclosed. Similarly, the ends of the frame precursor structure may also include an angled cut (210N and 220N) in the top lip, the lower shelf, and the bottom flange to accommodate formation of a corner joint.

Figure 2D:
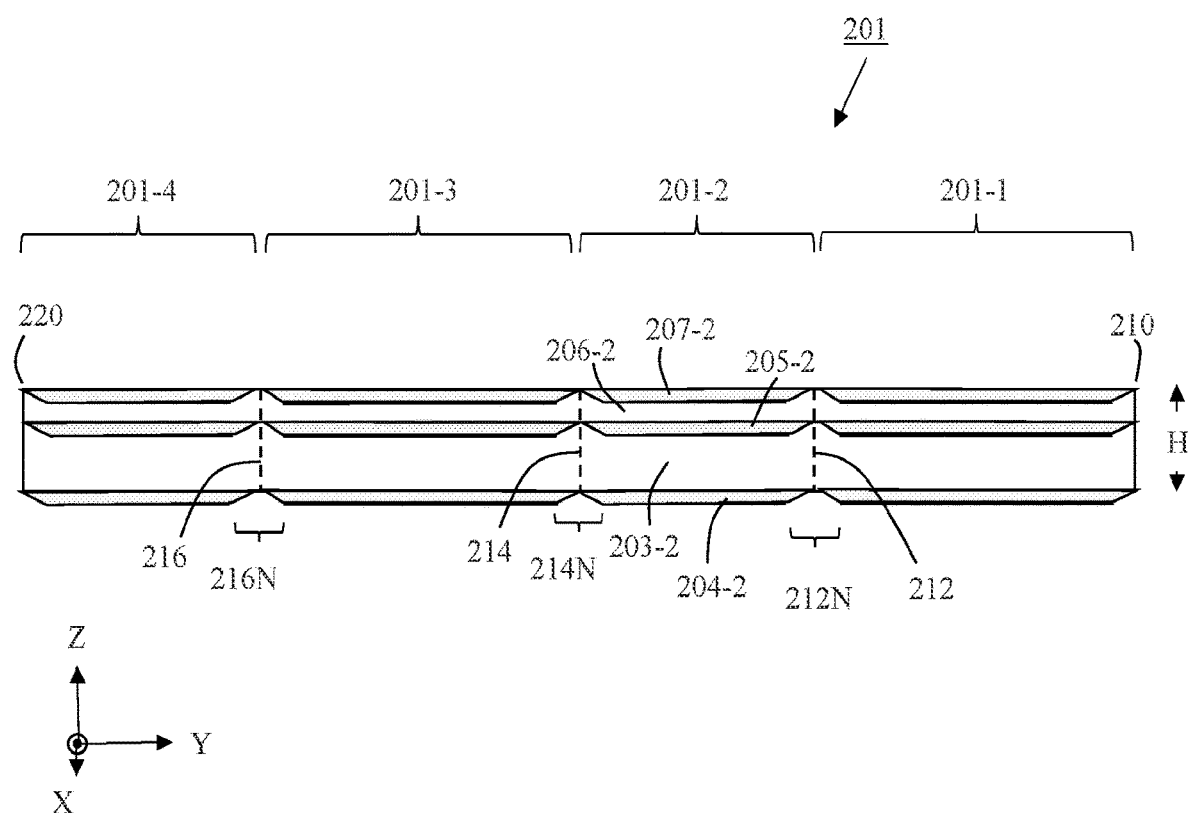
FIG. 2D is a side view with slight elevation of a non-limiting example of a frame precursor structure according to some embodiments.

In FIG. 2D, there is shown a non-limiting example of a side view schematic (with slight elevation) of the frame precursor structure facing the side that can receive the panel. For clarity, not all of the features are labelled, but in combination with the other figures, the identity of each feature is self-evident.

Figure 2E:
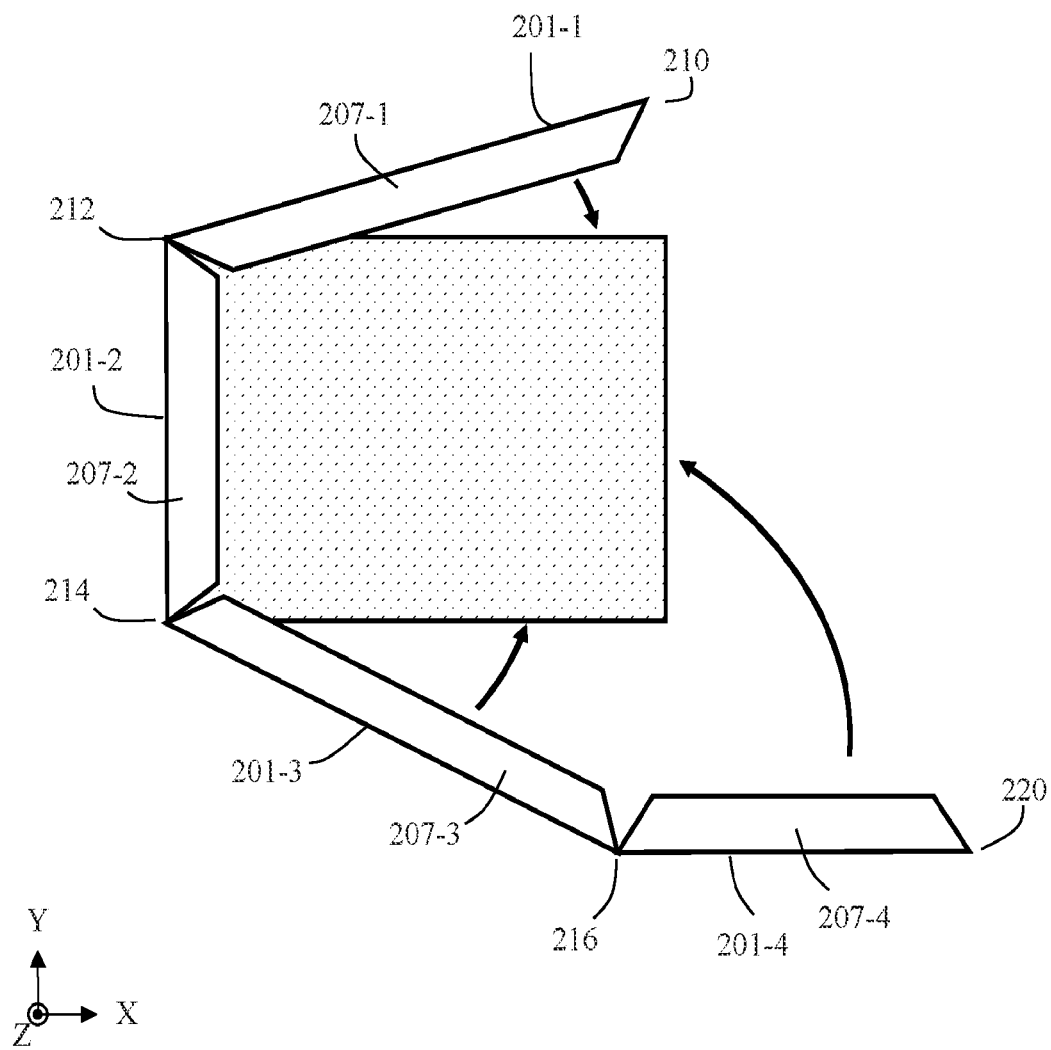
FIG. 2E is a plan view of a non-limiting example of a frame precursor structure and a panel at an intermediate stage of assembly according to some embodiments.

Referring to FIG. 2E, there is a plan view showing a non-limiting example of an intermediate state of assembling the framed panel structure where the frame precursor structure has received the panel edge 190-2 into frame section 201-2 and bends are being formed along the bend precursor axes as other frame sections move closer to their intended final positions around the panel. Note that assembly does not have to start with panel edge 190-2 but may instead start with any panel edge or corner. Forming the corner joint 118 (see FIG. 1A) where the two ends (210 and 220) of the frame precursor structure meet may be a final step in this portion of the framed panel structure assembly, but there may be additional steps to further secure or modify the frame (e.g., adding optional support brackets, tightening optional bolts, or the like). In some embodiments, assembling the framed panel structure may include use of an assembly apparatus that holds and manipulates the panel and frame precursor structure(s). With respect to orientation of the components during assembly relative to the assembly apparatus, the plan view of FIG. 2E may represent a view from above, or alternatively a view from below, or even a view from the side, depending on the nature of the assembly apparatus.

In some embodiments, the corner bends and/or corner joints may include features capable of forming interlocking structures. For example, a bottom flange or other portion on one side of the corner may include a locking element that may be received into an opening on the other side of the corner.

Although not illustrated in FIGS. 2A-2E, one or more frame sections may further include a support wall extending from the bottom flange to the panel containment structure or to the frame sidewall, as described in more detail elsewhere herein.

In some embodiments, the frame precursor structure 201 may be substantially linear (as shown) prior to assembling the framed panel structure. In some embodiments, the frame precursor structure may be received by an assembler perhaps already partially bent at one or more corner bend precursor axes. One or more corner bend precursor axes may be pre-scored or include a furrow or features that promote bending along the height access between the frame sections.

The frame and frame precursor structures described in FIGS. 1A-C and 2A-E are non-limiting examples provided in order to illustrate how some of the frame support substructures and frame support walls described below may be implemented in a frame. Alternative designs and structures may be used effectively with such support structures. In some embodiments, rather than using one frame precursor structure, multiple frame precursor structures may be used to enclose a panel. For example, with a rectangular panel, two similar frame precursor structures, each having one corner bend precursor axis may be used to form a framed panel structure that may include two corner joints at opposite corners and two corner bends at opposite corners. Alternatively, a first frame precursor structure may have two corner bend precursor axes and a second frame precursor structure may have no corner bend precursor axes and be used to form a framed panel structure that may include two corner joints at adjacent corners and two corner bends also at adjacent corners. Alternatively, three frame precursor structures may be used where one may have one corner bend precursor axis and the other two may not, whereby a framed panel structure may include one corner bend and three corner joints. Alternatively, four frame precursor structures may be used wherein none have a corner bend precursor axis and the framed panel structure may include four corner joints.

Figure 3:
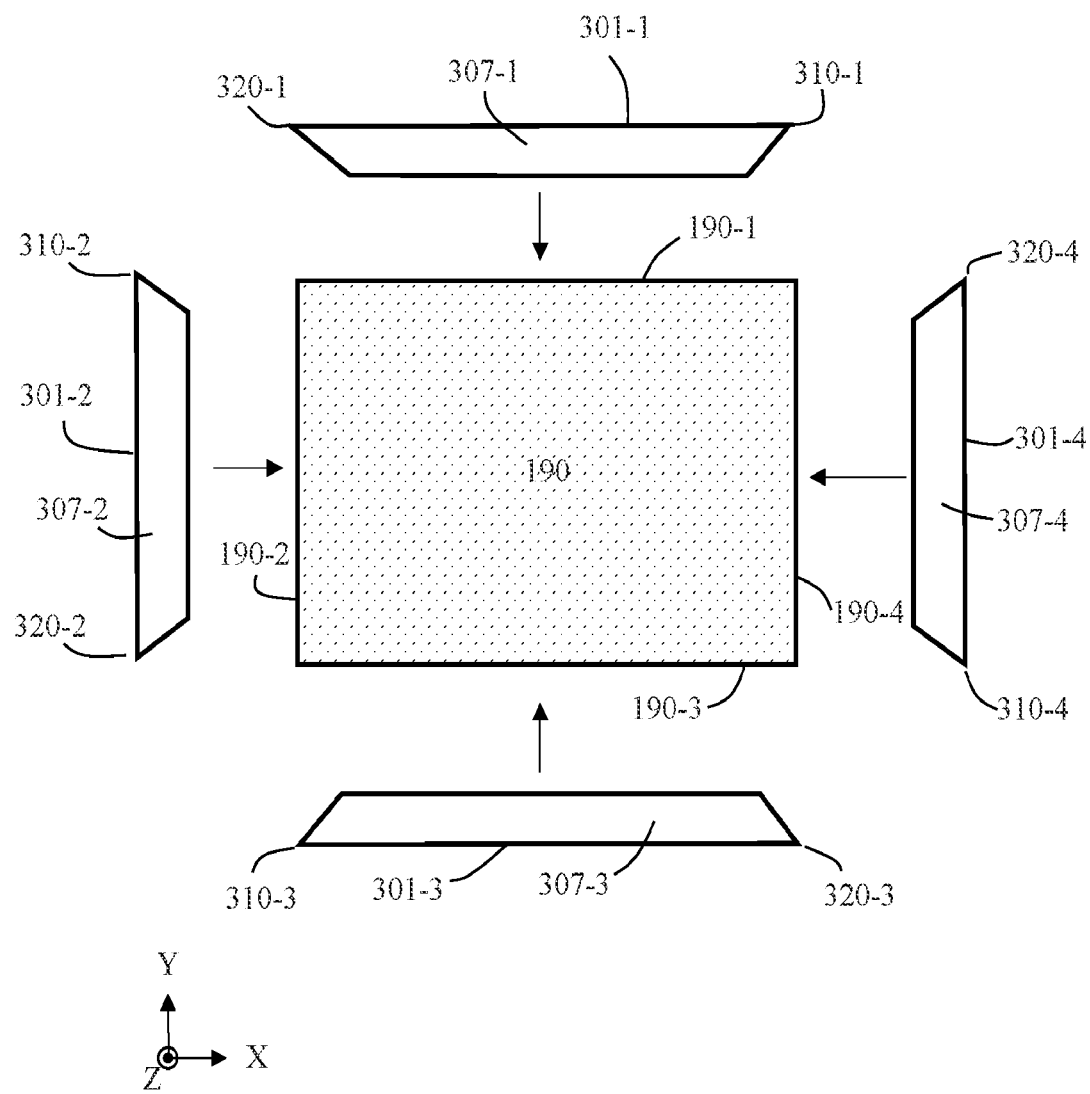
FIG. 3 is a plan view showing a non-limiting example of assembling a frame using four frame precursor structures according to some embodiments.

FIG. 3 is a plan view showing a non-limiting example of assembling a frame using four frame precursor structures according to some embodiments. Each frame precursor structure (each of which may also be referred to herein as a frame section) 301-1, 301-2, 301-3, 301-4 may optionally include any of the features described above, such as a bottom flange, a side wall, and even a panel containment structure that may include a lower shelf, a pocket wall and a top lip. In some cases, one or more frame sections may further include a support wall extending from the bottom flange to the panel containment structure or to the frame sidewall as discussed elsewhere herein. In this view, only the top lip 307-1, 307-2, 307-3, 307-4 of each frame precursor structure is visible. Each frame precursor structure may have a first end 310-1, 310-2, 310-3, 310-4 and a second end 320-1, 320-2, 320-3, 320-4. When assembled, a first end of one frame precursor structure may form a corner joint with a second end of an adjacent frame precursor structure. As discussed with respect to FIG. 2E, the plan view of FIG. 2E may represent a view from above, or alternatively a view from below, or even a view from the side, depending on the nature of the assembly apparatus.

As indicated by the arrows, a first frame precursor structure may be designed to fit with or attach to a first panel edge 190-1 of panel 190, a second frame precursor structure 301-2 may be designed to fit with or attach to a second panel edge 190-2, a third frame precursor structure 301-3 may be designed to fit with third panel edge 190-3, and even a fourth frame precursor structure 301-4 may be designed to fit with fourth panel edge 190-4. There are numerous variations regarding the sequence used to assemble the frame. In some embodiments, all four frame precursor structures can concurrently be brought together with their respective panel edges and attached at approximately the same time. In some cases, attachment may be sequential and may be in any order. In some embodiments, just two or three frame precursor structures are concurrently brought together with their respective panel edges and the remaining frame precursor structures are attached later or already pre-attached. In some embodiments, two or three of the frame precursor structures may be first attached to each other via a corner joint connection and then attached to the panel. In some cases, a frame precursor structure may initially be brought together with its respective panel edge at an angle rather than flush or parallel. In some cases, the choice of assembly sequence may in part be dependent upon the design of the corner joint and optional corner joint connection to be used. In some embodiments, corners joint connection may, for example, be made using clinching, rivets, screws, nuts/bolts, welding, adhesives, or some other connection method or mechanism. Note that a weld or welding may refer to any type of weld or welding including, but not limited to, gas welding, arc welding, resistance welding, energy beam welding, solid-state welding, friction welding, fusion welding, or some other welding.

In some embodiments, a finished frame (whether made from a continuous piece or from multiple frame section pieces) may further include one or more cross bars that may extend from one frame section to an opposite or adjacent frame section. In some embodiments with respect to a rectangular frame, a cross bar may extend between the two longest opposing frame sections. In some cases, a cross bar may connect two opposing frame sections at about their middle areas. Cross bars may act to strengthen the frame. A cross bar may be connected to the frame at the bottom flange, a frame sidewall, or at some other frame feature including, but not limited to, support walls (discussed below). In some embodiments, a cross bar structure may include an upper surface upon which the panel may rest or optionally be adhered to. In some cases, cross bars may be readily attached as part of the panel mounting process (e.g., as discussed in FIGS. 2E and 3). That is, an additional separate step may not be needed in some cases. In some embodiments, the cross bars may be formed of the framework material used for the rest of the frame. In some embodiments, the cross bars may use a different material.

Figure 4A:
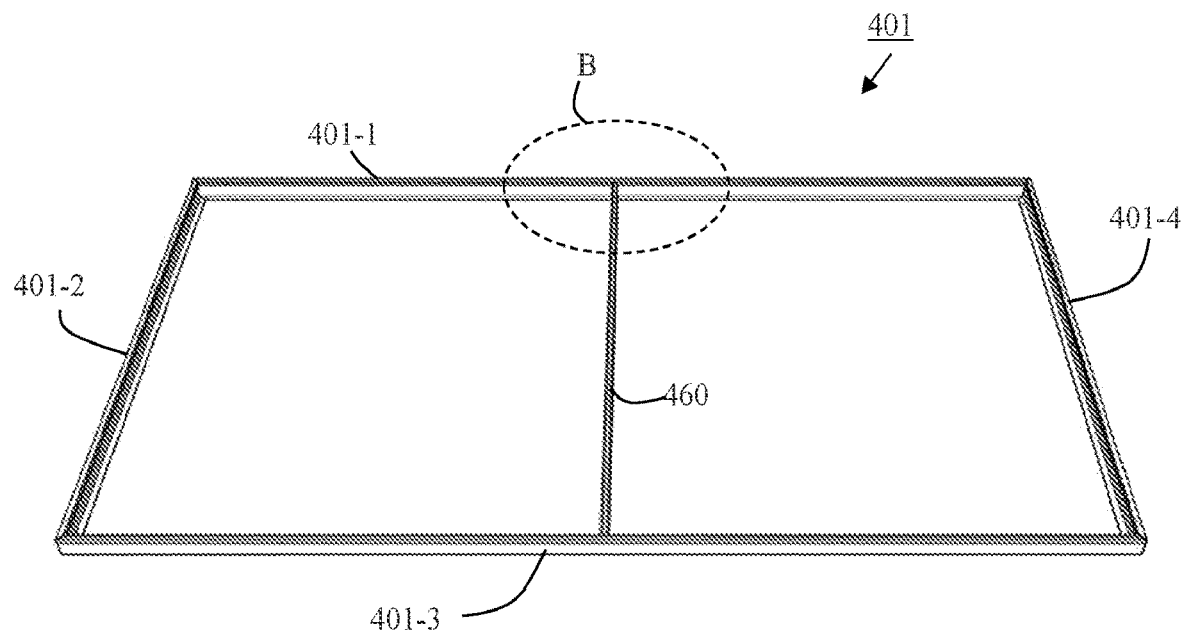
FIG. 4A is a perspective view of a non-limiting example of a frame that includes a cross bar according to some embodiments.

FIG. 4A is a perspective view of a non-limiting example of a frame that includes a cross bar according to some embodiments. For clarity, the framed panel is not shown. In some cases, frame 401 may include a first frame section 401-1, second frame section 401-2, third frame section 401-3, and even fourth frame section 401-4. Cross bar 460 may be connected to opposing frame sections 401-1 and 401-3. In some embodiments, connection may, for example, be made using clinching, crimping, rivets, screws, nuts/bolts, welding, adhesives, or some other connection method or mechanism, or the like.

Figure 4B:
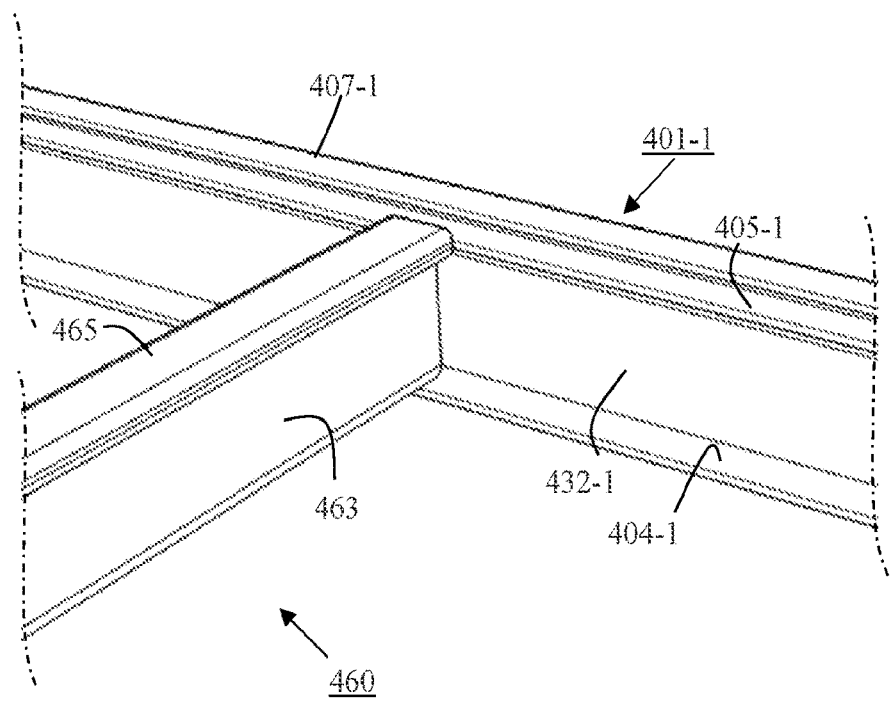
FIG. 4B is a zoomed in view of area B from FIG. 4A according to some embodiments.

FIG. 4B is a zoomed in view of area B from FIG. 4A. In some cases, first frame section 401-1 may optionally have a box frame structure as described below. Frame section 401-1 may, for example, include a bottom flange 404-1, a support wall 432-1, lower shelf 405-1, top lip 407-1, and frame sidewall (not visible in this view). In some embodiments cross bar 460 may include a cross bar top surface 465 and cross bar sidewall 463. Cross bar 460 may optionally have a box type of structure including another sidewall (not visible in this figure) opposite cross bar sidewall 463 and a bottom flange or bottom surface (not visible in this figure) opposite cross bar top surface 465. In some cases, the cross bar top surface 465 may contact the panel and may optionally include an adhesive layer to help secure the panel. In some embodiments, the cross bar top surface 465 may be flush (such as at the same height) with lower shelf 405-1 of the first frame section. In some embodiments, cross bar 465 may be connected to the first frame section at the frame sidewall, bottom flange, support wall, or any combination.

The framework material should have sufficient strength to support the panel. In some embodiments, the framework material may include a metal such as uncoated steel, coated steel, stainless steel, aluminum, or another metal or metal alloy (perhaps coated or uncoated), or the like. In some embodiments, the framework material may be a coated metal such as coated steel or the like that includes an anti-corrosion coating or treatment. For example, coated steel may include metallic-coated steel, organic-coated steel, or tinplate. Some non-limiting examples of metallic coatings for steel may include zinc and zinc alloys (e.g., a Zn—Al alloy), aluminum, magnesium, or the like. Depending on the coating, such metallic coatings may be applied by hot dip galvanization, electro-galvanizing, thermal spray, or the like. Some non-limiting examples of organic coatings may include polyesters or PVDF, which may be applied from a paint or other coatable mixture. Tinplate may be made by coating tin onto the cold-rolled steel, e.g., by electroplating. In some embodiments, the thickness of coated steel for use as a framework material may be in a range of about 0.5 to about 0.6 mm, alternatively about 0.6 to about 0.7 mm, alternatively about 0.7 to about 0.8 mm, alternatively about 0.8 to about 0.9 mm, alternatively about 0.9 to about 1.0 mm, alternatively about 1.0 to about 1.2 mm, alternatively about 1.2 to about 1.4 mm, alternatively about 1.4 to about 1.6 mm, alternatively about 1.6 to about 1.8 mm, alternatively about 1.8 to about 2.0 mm, or any combination or permutation of ranges thereof, or the like. When a coated steel framework material may be used to make a frame for a conventional photovoltaic solar panel, in some embodiments, the thickness may be in a range of about 0.7 to about 1.4 mm.

In some embodiments, steel may be a steel other than stainless steel. For some applications, e.g., for photovoltaic solar panels, steel may have a useful combination of technical and commercial benefits. Steel can have properties that may be applied in the material selection, fabrication, and long-term durability that are useful to the form and function of the frame or frame precursor structure product. During preproduction, steel may be readily coated with anti-corrosion coatings employing multiple chemistries that offer corrosion resistance which can be beneficial to the durability of the frames. Steel may be painted with clear or specific colors that may optionally allow identification of a specific module selection of various categories. Because painting or anti-corrosion coatings may be applied in high-speed manufacturing formats, the cost and durability are more effective than most other metals. Steel may optionally be both painted and have anti-corrosion coatings, allowing for multiple benefits to the branding, module identification, and long-term maintenance over non-steel module frames.

Steel is a highly durable material that may be significantly deformed while retaining its toughness and resistance to structural failure. The properties of toughness while being deformed may be referred to as ductility. Due to the ductility of steel, it may be shaped starting from a thin sheet of material, e.g., wrapped around a coil, which may be fed directly into a punching station that may employ a variety of methods to cut or partially cut or create grooves in the face of the steel sheet. Following this process, the steel which has been modified in the punching station may be fed into a linear and non-linear set of rollers which can deform the steel sheet into a new profile, of which many variations are possible. Due to the ductility of steel, this process may be performed at high speed, with production speeds from less than about 0.1 meters/second to over about 4.0 meters/second. Steel's compatibility with this high-speed forming process may provide significant manufacturing cost advantages. Due to steel's ductility, it may be bent into simple or complex shapes that will retain their relative shape or position for the life of the product. In some embodiments, steel that has been shaped into simple or complex forms may also be designed to yield or partially yield at specific locations or along a predetermined path as part of intended installation or operational parameters.

Steel has electrical properties which may allow it to act as a code-approved path of intended electricity, such as to create an electrical ground or electrical bonding. Due to the properties of steel and the potential anti-corrosion or paint coatings available, the electrical ground or electrical bonding may still occur without the need for additional hardware or devices. When steel module frames are attached directly to a steel structure, most electrical codes allow for this connection to be considered a competent electrical ground or electrical bond. This means that the framed panel structures may connect directly to a steel substructure and may be considered to have achieved sufficient electrical ground or electrical bond sufficient to meet code, with or without addition of hardware, as part of the module-to-substructure attachment.

Steel's magnetic properties may allow for special features and benefits through the use of magnetic steel frames. The magnetic properties of steel may allow for simple attachments of appurtenances utilizing few or no added hardware. Steel's magnetic properties may allow for sensory devices to collect useful data during the manufacture of a frame precursor structure or data regarding a panel installation. Steel's magnetic properties may allow for robot sensors to be used to assist in the proper installation or deinstallation of panel modules. Steel's magnetic properties may allow the easy attachment or pre-attachment of hardware of various sorts to the module frame to facilitate installation of additional equipment.

In some cases, the frame precursor structure may be fabricated from an elongated sheet of the framework material that can be bendable and cuttable. The elongated sheet may be cut, for example, using a water cutter, a laser, a punch, a saw, or the like, depending on the framework material. The cuts may be used to form some of the various features described herein such as notches, holes, furrows or other features. After at least some of the cuts have been made, the elongated sheet may be folded to form at least a portion of the frame precursor structure. Such folding may include, but is not limited to, roll forming. In some embodiments, the cutting and folding processes may be applied to a coated steel-based framework material.

Figure 5:
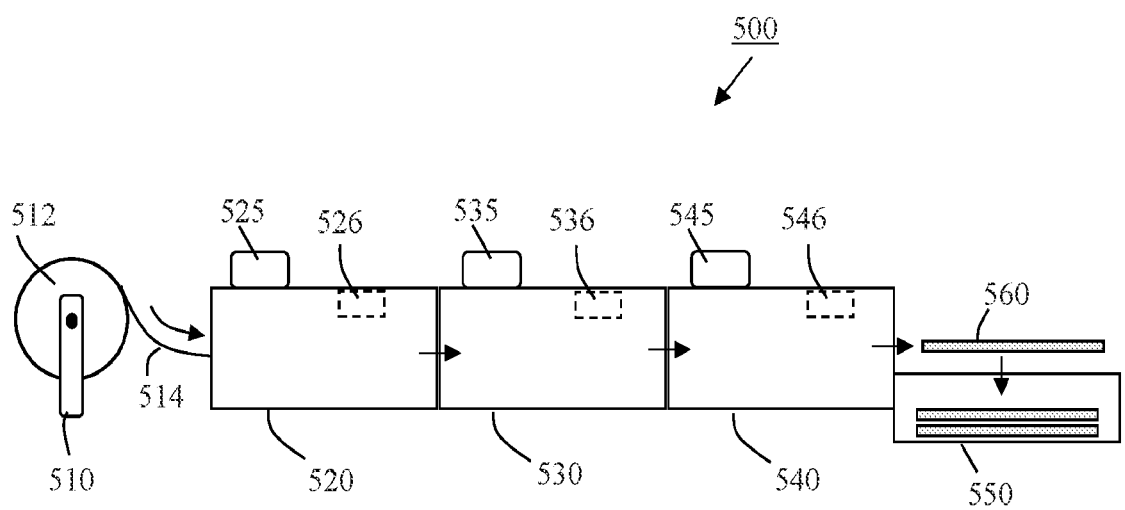
FIG. 5 is a schematic diagram of a non-limiting example of a manufacturing process line for making frame precursor structures according to some embodiments.

FIG. 5 is schematic diagram showing a non-limiting example of a manufacturing process line for making frame precursor structures according to some embodiments. Manufacturing process line 500 may include a framework material station 510 having framework material that may be fed into the next station. In some embodiments, the framework material may be in the form of sheets that are pre-cut to the final desired length. In some embodiments, the framework material may be fed continuously to the next station. For example, framework material station 510 may include a coil 512 of coated steel 514. The coated steel 514 may be supplied to punching station 520. For example, the punching station 520 may pull the coated steel 514 from the coil. In some embodiments, certain cutting and/or punching processes may be performed at punching station 520 to cut and/or remove predetermined sections of the framework material to make a patterned framework material. In some embodiments, the framework material may be cut to a desired length at the punching station, if such cut has not yet been performed. In some embodiments, the process may be controlled to high tolerances. Punching station 520 may include a microprocessor 525 and machine software and/or firmware that may control the cutting. Punching station 520 may include one or more sensors 526 that provide data to the microprocessor which may be used to monitor the punching processes or identify defects. The microprocessor 525 may be in electronic communication with another microprocessor or with an external computer for sending or receiving data or instructions. Such electronic communication may be through cables or wireless methods.

After the punching station 520, the patterned framework material, e.g., coated steel or the like, may be received by a roll forming station 530. The steel may be shaped in a linear fashion using multiple rollers that provide a graduated bending process to form the steel into the desired shape such as shaped framework material. The design of the rollers, order of the rollers, and tolerances may be highly precise, and may result in a fully, or even nearly fully, shaped and punched frame precursor structure. Roll forming station 530 may include a microprocessor 535 and machine software and/or firmware that may control the roll forming.

Roll forming station 530 may include one or more sensors 536 that provide data to the microprocessor which may be used to monitor the bending and folding processes or identify defects. The microprocessor 535 may be in electronic communication with another microprocessor or with an external computer for sending or receiving data or instructions. Such electronic communication may be through cables or wireless methods. In some embodiments, the framework material may be cut to a desired length at the roll forming station, if such cut has not yet been performed. In some embodiments, the roll forming station may include an adhesive applicator tool to apply an appropriate adhesive to a predetermined portion of the framework material while shaping framework material, e.g., to help the shaped framework material to maintain its shape.

After the roll forming station 530, the shaped framework material, e.g., coated steel, may be received by a post forming station 540. Some non-limiting examples of post forming processes may include cutting the frame precursor structures to length, buffing/deburring, cleaning, or even passing the frame precursor structures through straightening rollers or dies that may ensure product accuracy. Post forming station 540 may include a microprocessor 545 and machine software and/or firmware that may control one or more post forming processes. Post forming station 540 may include one or more sensors 546 that provide data to the microprocessor which may be used to monitor the post forming processes or identify defects or out-of-tolerance parts. These data may be fed back to roll forming station 530 for active adjustment of roll forming rollers or adjustment rollers. Post forming station 540 may include a cleaning section. The microprocessor 545 may be in electronic communication with another microprocessor or with an external computer for sending or receiving data or instructions. Such electronic communication may be through cables or wireless methods.

After the post forming station 540, finished, or even nearly finished, frame precursor structures 560 may be received by a finished product station 550. The frame precursor structures may be loaded into transportation containers and prepared for delivery, e.g., to a solar panel module production facility.

In some embodiments, the framework material may proceed in a generally linear, perhaps forward, direction from one station to the next. In some embodiments, the direction of framework material may be temporarily reversed within a station, for example, to repeat a particular step. In some embodiments, there may be multiple punching stations, roll forming stations, and/or post forming stations.

For any of the aforementioned stations, the microprocessor(s) may provide control signals to electro-mechanical motors that may be responsible for moving the intermediate products along the manufacturing line. Depending upon the process to be performed on the intermediate products, software/firmware running on the microprocessor(s) may dictate various factors/parameters of production. For merely some non-limiting examples, a microprocessor may dictate the speed and/or direction of the intermediate products traversing a given station. In some embodiments, a microprocessor may dictate when and/or how the intermediate products are to be shaped, punched, cut, or the like in order to affect the desired intermediate/final products. In some embodiments, a microprocessor may receive signals from one or more sensors for monitoring manufacturing progress, identifying defects or out-of-tolerance parts, or measuring some other useful property of intermediate products as they are made. For example, an optical or imaging sensor(s) may provide data that allows a microprocessor to assess manufacturing status and/or how well a particular production step was performed. In some embodiments, if quality is below standard, a microprocessor may send a status alert signal to a system operator and/or to another microprocessor. Other sensors may also be useful to monitor manufacturing status and/or quality control metrics. In addition to optical and imaging sensors, non-limiting examples of potentially useful sensors or their components may include laser-based sensors including, but not limited to, laser position sensors, vision systems including, but not limited to vision measurement and shape vision systems, contact sensors including, but not limited to contact position sensors, vibration sensors, thermal sensors, conductivity sensors, roughness sensors, profilometers, ultrasonic sensors, stress sensors, or the like.

In some embodiments, the frame or framed panel structure may be attached to a support structure that may hold the frame or framed panel structure in a predetermined position. Such support structures and systems may take many forms, but some non-limiting examples may include racking, rail mounts, pole mounts, tracking mounts, or non-tracking mounts, or the like. In combination with a support structure, a frame or framed panel structure may be attached to its intended target, including but not limited to, attachment to a building (e.g., a roof, a wall, an awning, or the like), to the ground, to a shade structure or carport, or to a moving or stationary vehicle. In some embodiments, a frame or framed panel structure may be attached directly to its intended target without an intermediate support structure. In such case, the target itself may act as the support structure.

To provide robust support and strength to the framed panel such as a solar panel, it may be useful for the frame to include one or more connection features, for example, when forming a corner joint between frame precursor structures or sections. For the purposes of describing various features and technology below, a frame, a frame precursor structure, and a frame section may be used interchangeably unless otherwise noted. In some cases, the frame may also include additional strengthening features such as cross bars that may extend from one frame section to an opposite or adjacent frame section. These additional strengthening features may also benefit from the use of one or more connection features. Similarly, in some embodiments, certain connection features may be used to attach a framed panel structure to a support structure such as racking.

In some embodiments, the frame or frame sections illustrated in FIGS. 1-3 may benefit from additional structural support features, such as frame support substructures, perhaps to improve the strength of the frame in some way to address various forces it may experience when used in a framed panel structure. For example, such additional support may enable the frame to hold larger panels (e.g., PV laminates), withstand greater environmental and/or handling forces (e.g., wind, snow, mounting, clamping, bending, torsional stresses, or the like), or increase PV module lifetime by reducing the number or intensity or of stress points, or improving their distribution. In some cases, structural support features may enable the use of framework materials that are thinner, easier to handle, or less expensive.

In some embodiments a useful structural support feature, such as a frame support substructure, may include a support wall extending (i) between the bottom flange and the frame sidewall, (ii) between the bottom flange and the lower shelf, or (iii) both (i) and (ii). In some cases, a frame or frame section including a support wall, bottom flange, sidewall, and lower shelf, may be advantageously produced from a single piece of framework material. In some cases, using a single piece of framework material for these features may simplify manufacturing thereby reducing costs and increasing throughput and yield. Such single piece manufacturing may also increase the lifetime of the frame by avoiding the many failure-prone attachments points that would be needed if these features were assembled from separate parts.

Figure 6A:
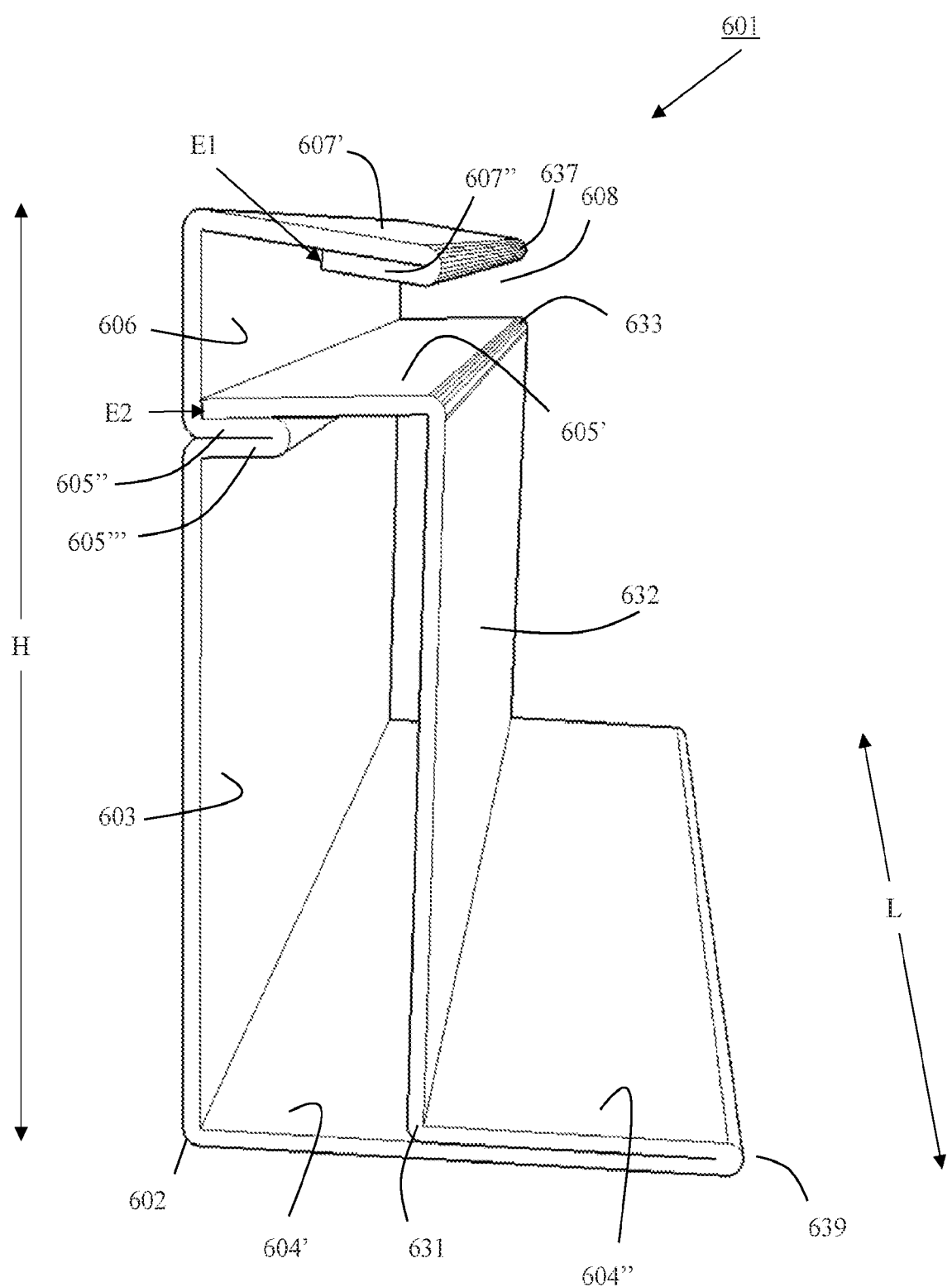
FIG. 6A is a perspective view of a cutaway portion of a non-limiting example of a frame section including a support wall according to some embodiments.
Figure 6B:
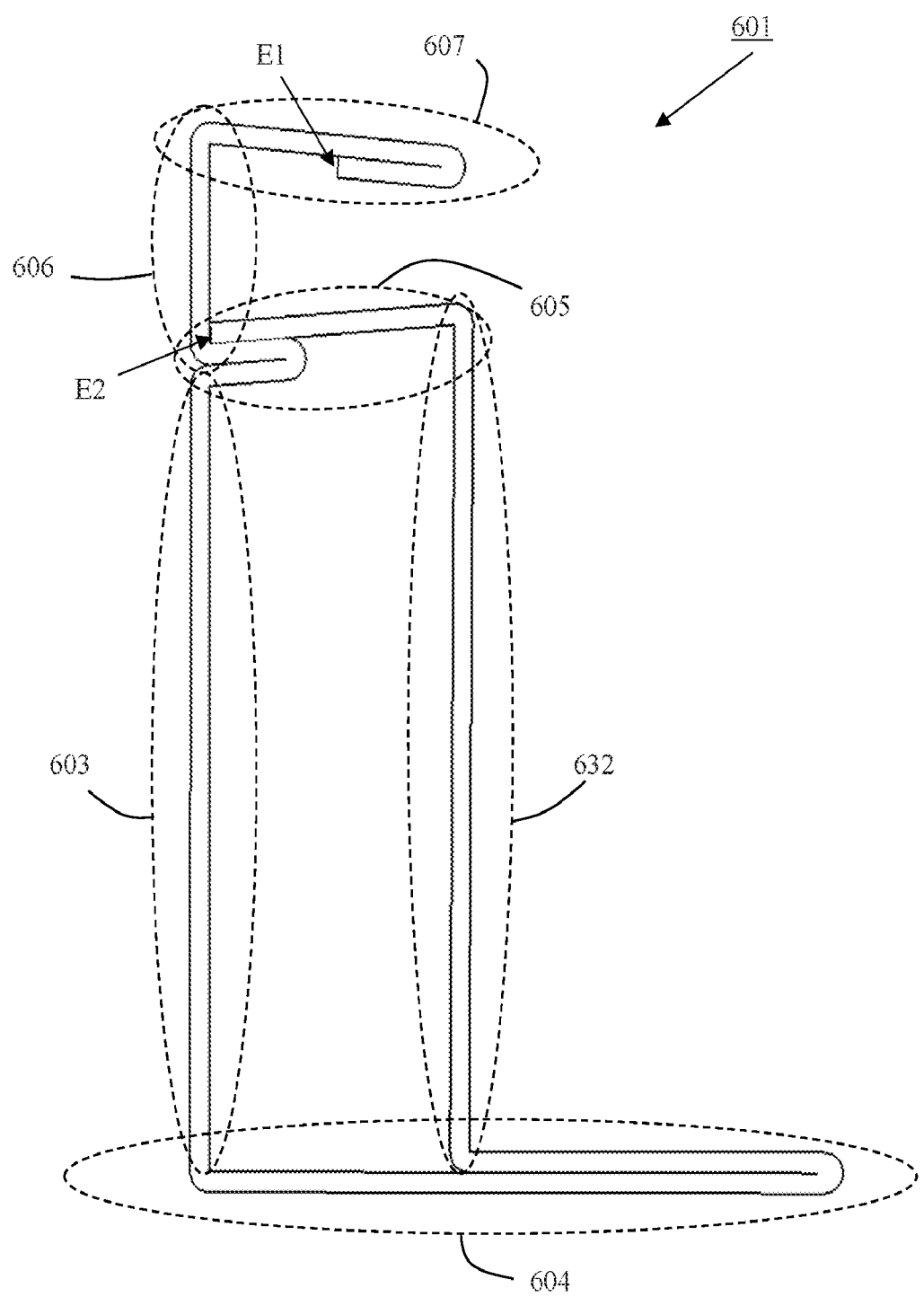
FIG. 6B is a cross-sectional view of the frame section from FIG. 6A according to some embodiments.

There are many embodiments of useful frame sections that include a support wall. FIG. 6A is a perspective view of a cutaway portion of a non-limiting example of a frame section including a support wall according to some embodiments. The height H and lengthwise L axes are also shown for reference. FIG. 6B is a cross-sectional view of the frame section from FIG. 6A, but labelled in a modified manner to clarify that any of the features may include multiple layers of framework material. Frame section 601 may include a framework material that has been cut and folded into a desired shape. Frame section 601 may include a bottom flange 604 provided at the base of the frame section, which in some embodiments may include multiple layers of framework material such as bottom flange layers 604' and 604". A frame sidewall 603 may be provided at an outer portion of the frame section and characterized by a height extending from the bottom flange. In some embodiments, a lengthwise fold 602 may define an intersection of the frame sidewall 603 and the bottom flange 604, e.g., with bottom flange layer 604'. A panel containment structure may be provided at an upper portion of the frame sidewall. The panel containment structure may include at least a lower shelf 605 extending from the frame sidewall and may also include a pocket wall 606, a top lip 607, and perhaps even a pocket region 608 for containing the panel. In some embodiments, some or all of the lower shelf 605 may include multiple layers of framework material, such as lower shelf layers 605', 605", 605'". In some embodiments, two or more lower shelf layers may be formed from a fold in the framework material at the upper portion of the frame sidewall. In some cases, the lower shelf layers 605" and 605" formed from the fold in framework material at the upper portion of the frame sidewall may be characterized as a panel containment support feature, upon which lower shelf layer 605' rests. In some embodiments, the top lip may be formed of multiple layers of framework material, such as top lip layer 607' and top lip layer 607" which may be formed from a top lip fold 637 to form a multilayered rounded top lip edge. A support wall 632 may be provided at an inner portion of the frame section (inner relative to the frame sidewall). In some embodiments, the support wall 632 may extend between the bottom flange and the lower shelf. In some embodiments, the frame section may include a reversing flange fold 639 such that a portion 604' of the bottom flange may include a double layer of framework material. In some embodiments, another lengthwise fold 631 may define an intersection of the support wall 632 with the bottom flange structure, e.g., with portion 604'. In some cases, a lengthwise fold 633 may define an intersection of the support wall with the lower shelf 605.

Figure 6C:
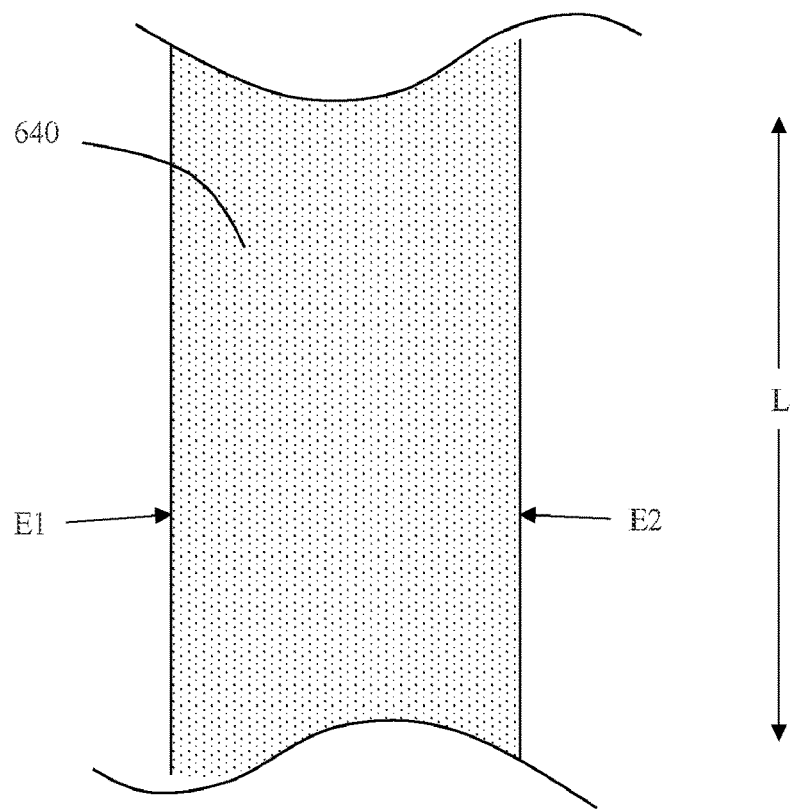
FIG. 6C is a plan view of a non-limiting example of a portion of framework material according to some embodiments.

FIG. 6C is a plan view of a non-limiting example of a portion of framework material 640 prior to any cutting, punching, or folding operations that may be used to make the frame section 601. The lengthwise dimension of the framework material is illustrated as are a first edge E1 and second edge E2, which are also labelled in FIGS. 6A and 6B. In some embodiments, such as shown in FIGS. 6A and 6B, E1 may correspond to the end of top lip layer 607" and E2 may correspond to the end of lower shelf layer 605'.

Figure 6D:
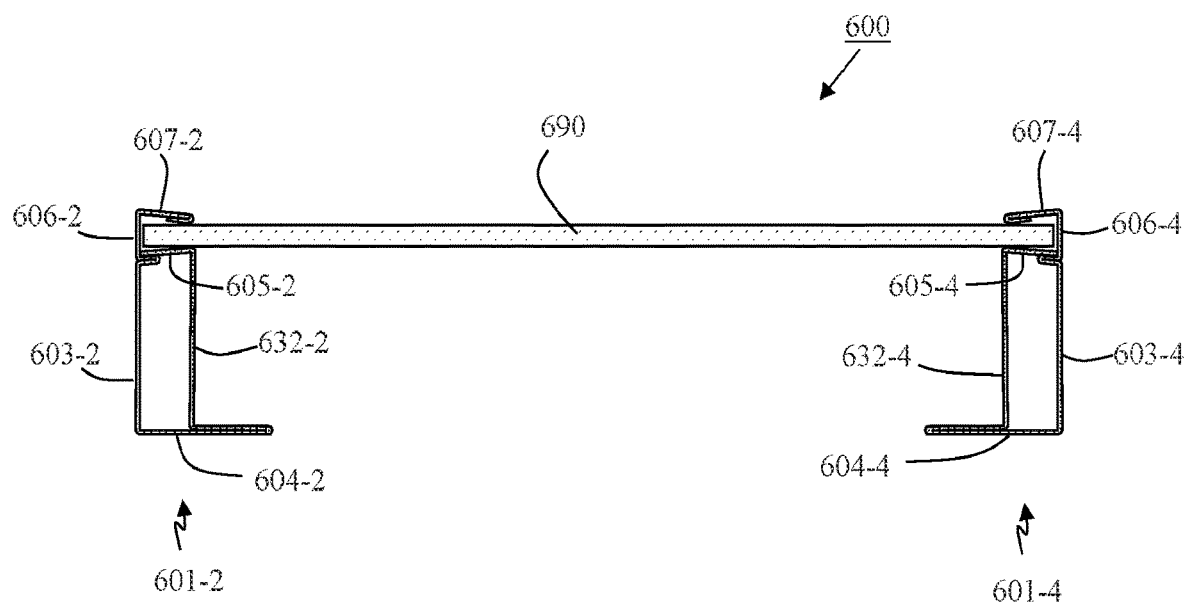
FIG. 6D is a cross-sectional view of a non-limiting example of a framed panel structure according to some embodiments.

FIG. 6D is a cross-sectional view of a non-limiting example of a framed panel structure according to some embodiments. Framed panel structure 600 may include various frame sections as previously discussed, e.g., frame section 601-2 and opposing frame section 601-4. In some embodiments, each frame section may include a frame sidewall 603-2, 603-4, a bottom flange 604-2, 604-4, a lower shelf 605-2, 605-4, a pocket wall 606-2, 606-4, a top lip 607-2, 607-4, and a support wall 632-2, 632-4. The panel 690 may be received onto each lower shelf, e.g., into a portion of each pocket region (perhaps formed by the lower shelf, the pocket wall, and the top lip) and secured in place, optionally with a sealant that may have adhesive properties (not shown). The frame sidewall of a frame section may be characterized as provided at an outer portion of the frame section whereas the support wall of the same frame section may be characterized as provided at an inner portion of the frame section. An outer portion, in some embodiments may include relative to the support wall position, the frame sidewall may be generally provided further from the center of the panel. An inner portion, in some embodiments may be relative to the frame sidewall position, the support wall may be generally provided closer to the center of the panel. An outer portion and inner portion may be relative terms with respect to the frame sidewall and support wall, and do not necessarily mean the outermost part or innermost part of a frame section (although that may be the case in some embodiments). Frames or frame precursor structures having a frame section like FIG. 6A or 6B may sometimes be referred to herein as a box frame, perhaps where the bottom flange, frame sidewall, lower shelf and support wall collectively form in cross-section an enclosed structure, in this case, one having four sides. However, a box frame may apply to any frame section that in cross section forms any enclosed shape. In some embodiments, the enclosed shape may involve at least the bottom flange, the frame sidewall, and the support wall, and have three or more apparent sides in cross section.

Although not shown in FIGS. 6A-6D, in some embodiments, a panel containment structure may only include a lower shelf 605. In some cases, a panel containment structure may include a pocket wall 606 but not include a top lip 607.

Figure 7:
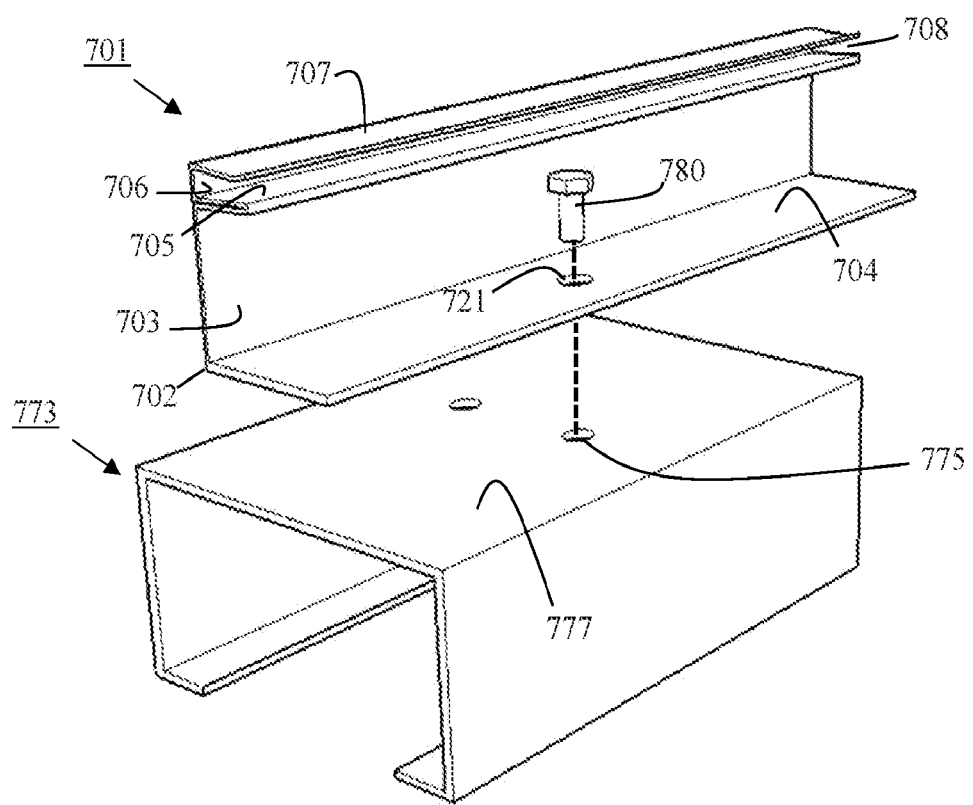
FIG. 7 is a perspective view of a cutaway portion of a non-limiting example of a frame section and a support structure according to some embodiments.

In some embodiments, the frame may include one or more mounting holes that may cooperate with one or more attachment features that secure the frame or framed panel structure to a support structure. FIG. 7 is a perspective view of a cutaway portion of a non-limiting example of a frame section and a support structure according to some embodiments. Frame section 701 may include a framework material that has been cut and folded into a desired shape. Frame section 701 may include a lengthwise fold 702 defining an intersection of a frame sidewall 703 with a bottom flange 704. The frame may further include a series of folds to form a panel containment structure including at least a lower shelf 705, and optionally a pocket wall 706, a top lip 707, and perhaps even a pocket region 708. The panel (not shown for clarity) may be received onto the lower shelf, e.g., into a portion of the pocket region and secured in place, optionally with a sealant that may have adhesive properties. The bottom flange 704 may include a mounting hole 721.

The support structure 773 may in some embodiments be a racking rail or even a rail mount and may include a support hole 775 in a frame interface surface 777. Mounting hole 721 may cooperate with an attachment feature 780 and the support hole 775 to secure the frame section 701 to the support structure 773. For example, in some embodiments, attachment feature may include a bolt and a nut (nut not shown) that secure the pieces together in a conventional fashion, optionally with one or more washers. Alternatively, the support hole may be threaded. Numerous other attachment features may be used instead of a bolt and nut, including, but not limited to, a flange bolt, a neo bolt, a lock bolt, a rivet, or the like, optionally with one or more washers. In some embodiments, an attachment feature may include tabs or other male features that form part of the support structure (e.g., the frame interface surface 777) that engage the mounting hole and secure the frame 701 to the support structure 773. Although shown as circular, the mounting hole or support hole may assume a different shape including, but not limited to, square, rectangular, oblong, oval, dogbone, dumbbell, star, pentagonal, hexagonal, or some other shape, such as a polygon, or the like. In some embodiments, one or more mounting holes may be provided in the sidewall instead of, or in addition to, the bottom flange. The frame and the support structure may collectively be referred to herein as a mounting structure or mounting system.

In some embodiments, the mounting hole may be a reinforced mounting hole. In some situations, it may be desirable that a mounting structure last for many years. Over time, forces acting on the mounting structure may cause failure of the attachment. For example, there may be sufficient deformations at a simple (non-reinforced) mounting hole/bolt head interface to cause the bolt to be pulled through the hole, perhaps thereby allowing the frame to detach from the support structure. In some embodiments, a reinforced mounting hole may be more resistant to these and other deformations, thereby increasing the functional lifetime of the mounting structure.

In some embodiments, a reinforced mounting hole may be characterized by an opening having a depth that can be greater than the average framework material thickness. In some embodiments, the depth may be at least about 25% greater than the framework material thickness, alternatively at least about 50% greater, alternatively at least about 75% greater, alternatively at least about 100% (2×) greater, alternatively at least about 150% greater, alternatively at least about 200% (3×) greater, alternatively at least about 250% greater, alternatively at least about 300% (4×) greater, or alternatively at least about 400% (5×) greater. In some embodiments, the opening depth may correspond to the distance between the uppermost and lowermost edges of the reinforced mounting hole.

Figure 8A:
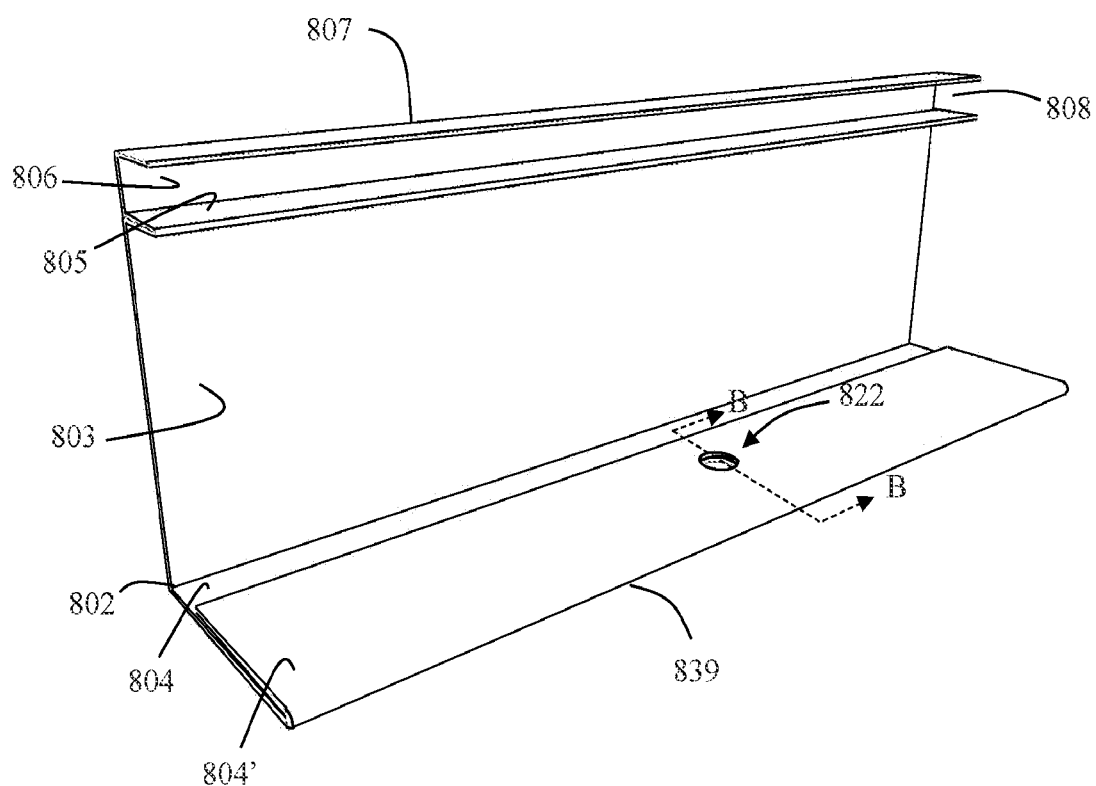
FIG. 8A is a perspective view of a cutaway portion of a non-limiting example of a frame section or frame precursor structure having a reinforced mounting hole according to some embodiments.
Figure 8B:
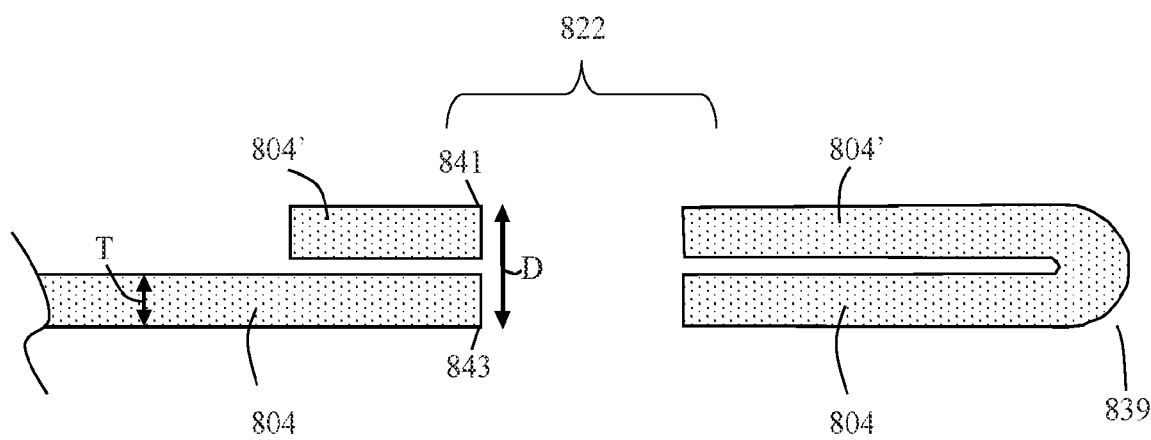
FIG. 8B is a cross-sectional view along cutline B-B of FIG. 8A illustrating a non-limiting example of a frame section or frame precursor structure having a reinforced mounting hole according to some embodiments.

FIG. 8A is a perspective view of a cutaway portion of a non-limiting example of a frame section or frame precursor structure having a reinforced mounting hole according to some embodiments. FIG. 8B is a cross-sectional view along cutline B-B of FIG. 5A illustrating a non-limiting example of a frame section or frame precursor structure having a reinforced mounting hole according to some embodiments. The frame section or frame precursor structure may include a framework material characterized by an average thickness T and which has been cut and folded into a desired shape. The frame section or frame precursor structure may include a lengthwise fold 802 defining an intersection of a frame sidewall 803 with a bottom flange 804. The frame may further include a series of folds to form a panel containment structure including at least a lower shelf 805, and optionally a pocket wall 806, a top lip 807, and perhaps even a pocket region 808. The frame section or frame precursor structure may include a reversing flange fold 839 such that a portion 804' of the bottom flange may include a double layer of framework material. A reinforced mounting hole 822 may be formed in bottom flange 804, 804'. The reinforced mounting hole may include an opening that may be characterized by a depth D that may correspond to the distance between the uppermost 541 and lowermost 543 edges of the reinforced mounting hole (which may correspond to the top of bottom flange portion 804' and the bottom of bottom flange 804, respectively). In some embodiments, the reinforcement and increased depth may be achieved by using multiple layers of framework material at the reinforced mounting hole location. In some embodiments, bottom flange portion 804' may be described as a first layer of framework material having a first layer opening and bottom flange 804 may be described as a second layer of framework material having a second layer opening in functional alignment with the first opening. Referring to FIGS. 8A and 8B, it should be noted that the reversing flange fold may in some embodiments form bottom flange portion 804' that can be folded underneath bottom flange 804, rather than over the top as shown.

Figure 8C:
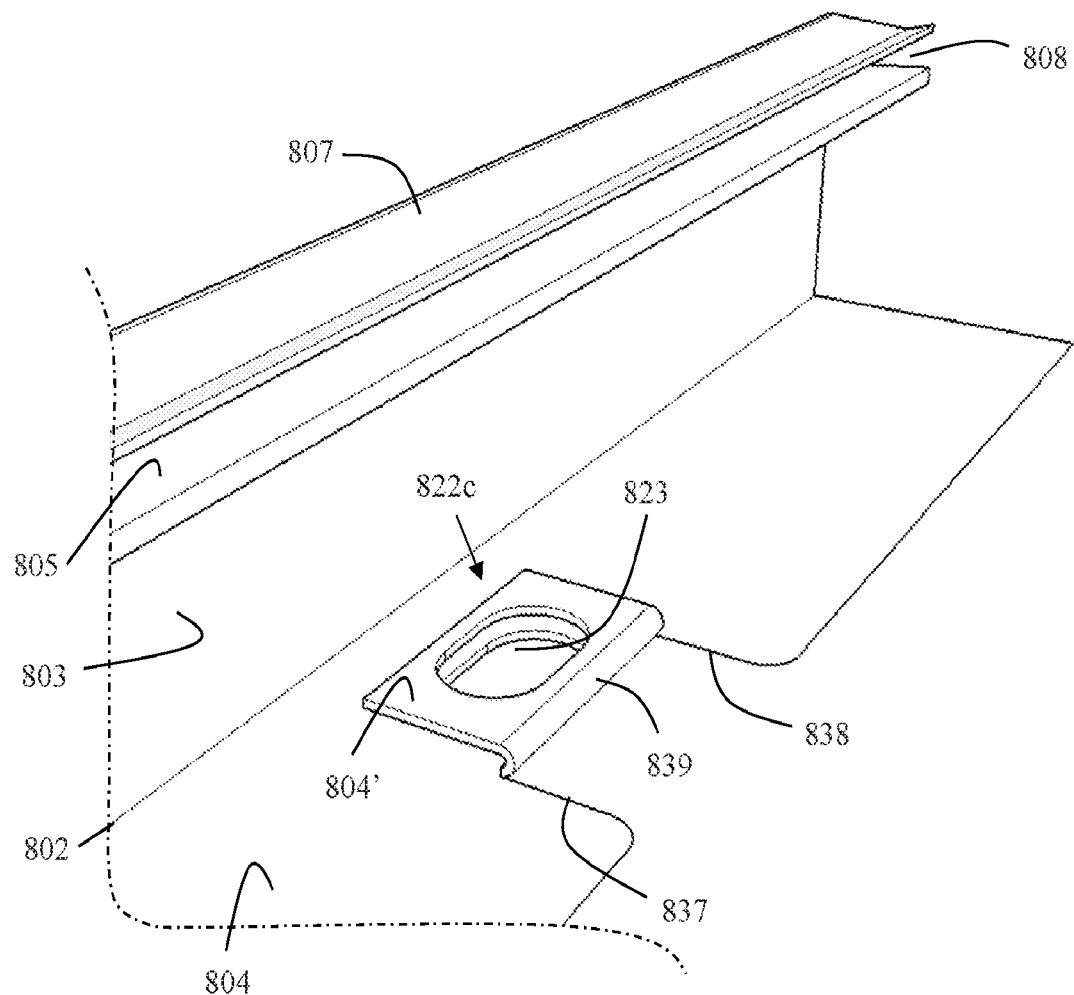
FIG. 8C is a perspective view of a cutaway portion of a non-limiting example of a frame section or frame precursor structure having a reinforced mounting hole according to some embodiments.

FIG. 8C is a perspective view of a cutaway portion of a non-limiting example of a frame section or frame precursor structure having a reinforced mounting hole 822c according to some embodiments. FIG. 8C is similar to FIG. 8A except that only a portion of the bottom flange 504 has been folded back (804') at reversing flange fold 839 at cut lines 837 and 838.

In some embodiments, a reinforced mounting hole may include or be formed from more than two layers of framework material, for example, through additional folds in the framework material. For example, reinforced mounting hole may include a first layer of framework material having a first layer opening, a second layer of framework material having a second layer opening in functional alignment with the first layer opening, and a third layer of framework material having a third opening in functional alignment with the second and first openings. A non-limiting example may include structures shown in FIGS. 13B and 14B, as discussed elsewhere herein.

Figure 9:
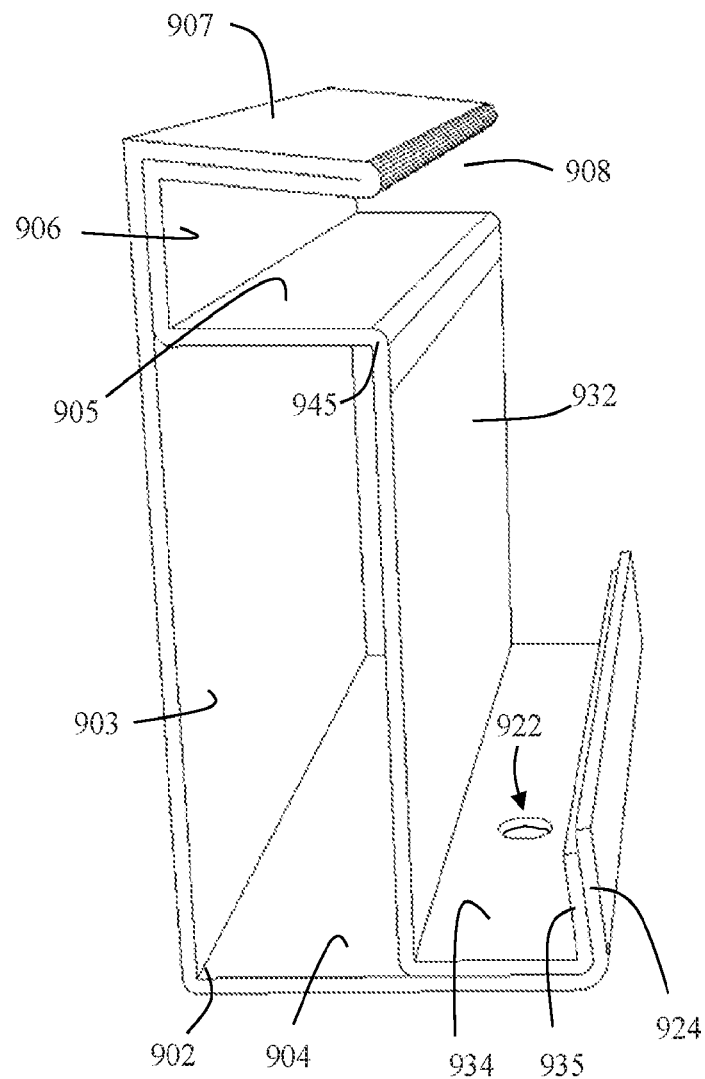
FIG. 9 is a perspective view of a cutaway portion of a non-limiting example of a frame section or frame precursor structure having a reinforced mounting hole according to some embodiments.

FIG. 9 is a perspective view of a cutaway portion of a non-limiting example of a frame section or frame precursor structure having a reinforced mounting hole according to some embodiments. The frame section or frame precursor structure may include a framework material characterized by an average thickness and which has been cut and folded into a desired shape. A frame section or frame precursor structure may include a lengthwise fold 902 that may define an intersection of a frame sidewall 903 with a bottom flange 904. The frame section or frame precursor structure may include a series of folds to form a panel containment structure that may include at least a lower shelf 905, and optionally a pocket wall 906, a top lip 907, and perhaps even a pocket region 908. The frame section or frame precursor structure may include a lengthwise fold 945 that may define an intersection of the lower shelf 905 and a support wall 932. The support wall may extend from the lower shelf 905 to, and may engage with, the bottom flange 904. Such engagement may include embodiments where at least a portion of the support wall may be held in place, e.g., by friction, geometry, spring forces, locking features, crimping, clinching, welding, adhesives, or the like. The support wall may provide additional structural stability to the frame. The support wall may include an end flange 934 that may be flush with the bottom flange 904. In some embodiments, the frame section or frame precursor structure may include vertical flanges 924 and 935 that may in some cases be approximately parallel to the frame sidewall 903. Vertical flanges 924 and 935 may, for example, be provided at an inward portion of the bottom flange. In some embodiments, the vertical flanges may provide additional structural support to the frame. The frame section or frame precursor may include a reinforced mounting hole 922 extending through both end flange 934 and bottom flange 904. The reinforced mounting hole may have a depth that may correspond approximately of the distance between the topside of end flange 934 and the bottom side of bottom flange 904. In some embodiments, the reinforcement and increased depth may be achieved by using multiple layers of framework material at the reinforced mounting hole location. In some embodiments, end flange 634 may be described as a first layer of framework material having a first layer opening, and bottom flange 604 may be described as a second layer of framework material having a second layer opening in functional alignment with the first opening.

Figure 10A:
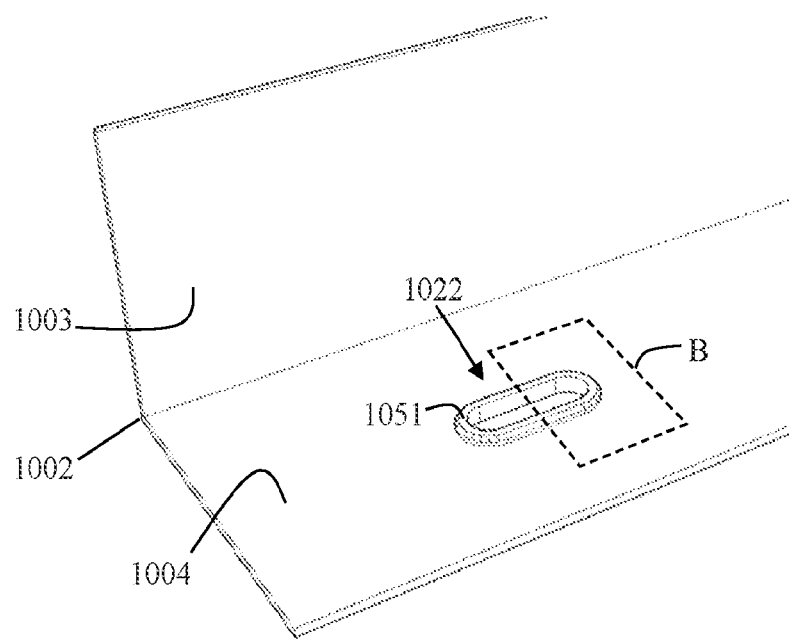
FIG. 10A is a perspective view of a cutaway portion of a non-limiting example of a frame section or frame precursor structure having a reinforced mounting hole according to some embodiments.
Figure 10B:
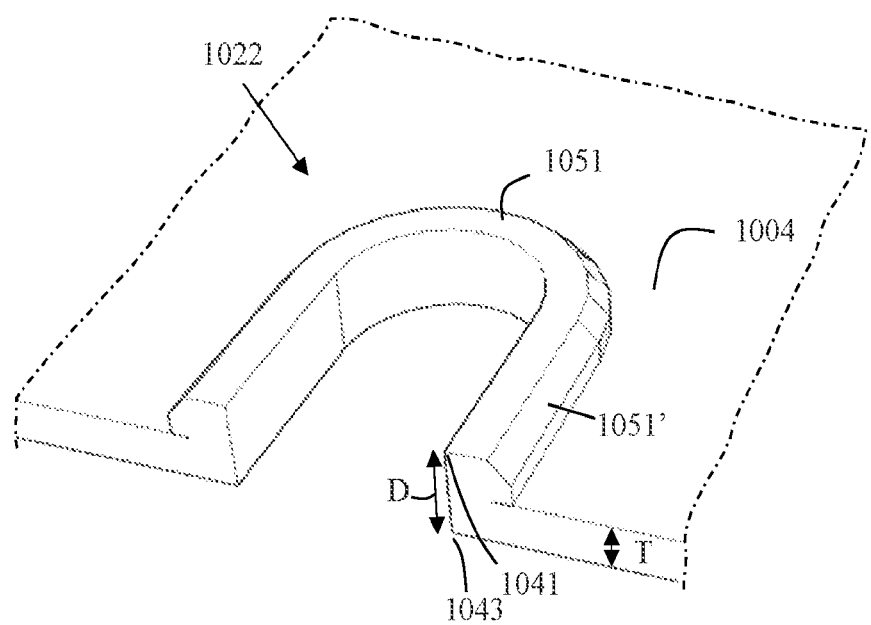
FIG. 10B is a perspective view of a cutaway subsection corresponding to box B of FIG. 10A illustrating a non-limiting example of a frame section or frame precursor structure having a reinforced mounting hole according to some embodiments.

FIG. 10A is a perspective view of a cutaway portion of a non-limiting example of a frame section or frame precursor structure having a reinforced mounting hole according to some embodiments. FIG. 10B is a perspective view of a cutaway subsection corresponding to box B of FIG. 10A illustrating a non-limiting example of a frame section or frame precursor structure having a reinforced mounting hole according to some embodiments. The frame section or frame precursor structure may include a framework material characterized by an average thickness T and which has been cut and folded into a desired shape. A frame section or frame precursor structure may include a lengthwise fold 1002 that may define an intersection of a frame sidewall 1003 with a bottom flange 1004. For clarity, other features, including but not limited to a panel containment structure, that may be part of the frame section or frame precursor structure are not shown. The reinforced mounting hole 1022 may include a raised rim structure 1051. The reinforced mounting hole includes an opening that may be characterized by a depth D that may correspond to the distance between the uppermost 1041 and lowermost 1043 edges of the reinforced mounting hole (which may correspond to the top of raised rim structure 1051 and the bottom of bottom flange 1004, respectively). Depth D may be greater than the average thickness T of the framework material. In some embodiments, the raised rim structure may include a taper 1051'. In some embodiments, a raised rim structure may be formed from a tool that pushes up a perimeter area of an initial hole and optionally forms a taper or other top feature. In some cases, a raised rim structure may be formed using a grommet tool. In some embodiments, a raised rim structure may be formed or partially formed at a roll forming station. In some embodiments, a raised rim structure may be formed or partially formed at a post process station. Although raised rim structures have been shown and discussed as extending upward from the plane of framework material, in some embodiments, a raised rim structure may instead extend downward with the similar effectiveness, and a raised rim structure herein can include either direction, or both directions, generally orthogonal to the plane from the framework material.

In some embodiments a raised rim structure may be formed by flow drilling or friction drilling. In some cases, a flow drill may include a conical bit, e.g., made from a heat-resistant carbide, that locally heats the framework material to a point where it softens so that the bit may penetrate the framework material to form the opening. The softened framework material forms the raised rim structure upon cooling. Relative to the plane of the framework material, a raised rim structure may extend in either direction or both directions. As discussed elsewhere, a raised rim structure perhaps formed by flow drilling may appear similar to as shown FIG. 12J and FIG. 12K, with or without the threading. In some embodiments, flow drilling may be used on a single layer of framework material, or optionally on multiple layers of framework material. In some cases, flow drilling on multiple layers of framework material may cause the layers to form a bond. This may sometimes be referred to as a type of friction welding.

Figure 10C:
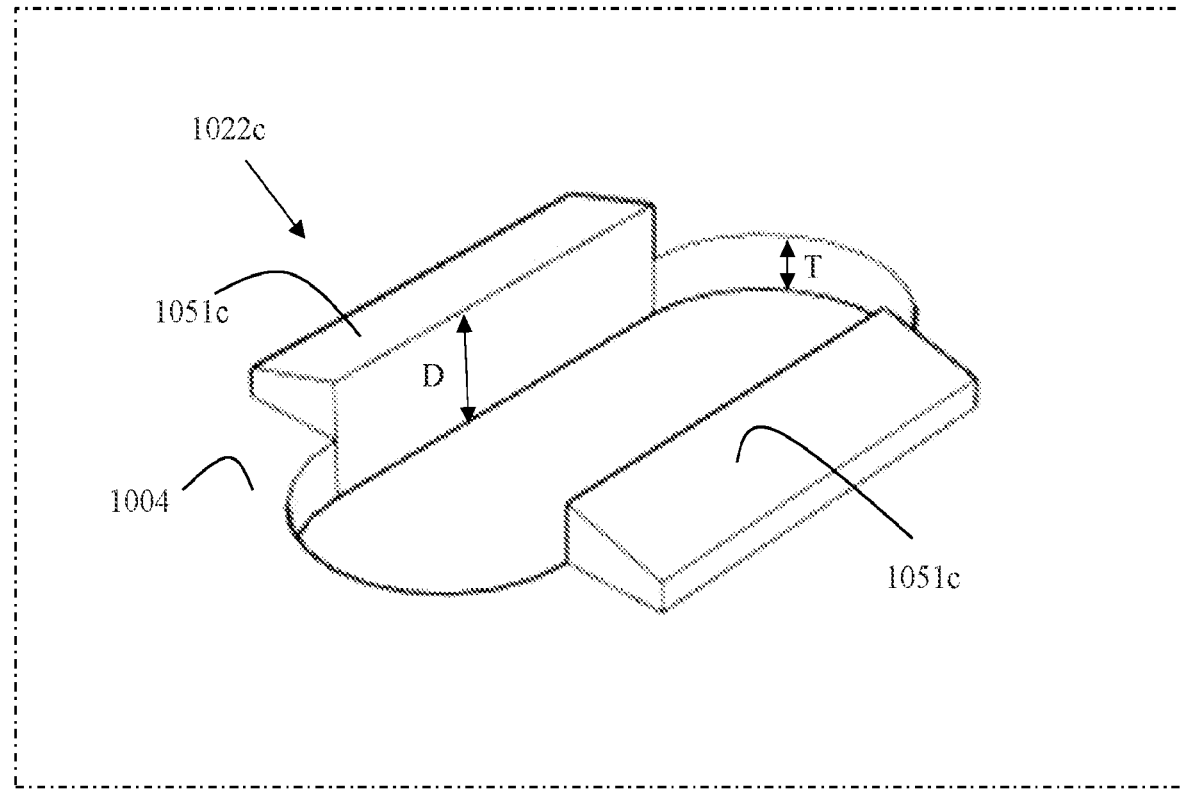
FIG. 10C is a perspective view of a cutaway portion of a non-limiting example of a frame section or frame precursor structure having a reinforced mounting hole according to some embodiments.
Figure 10D:
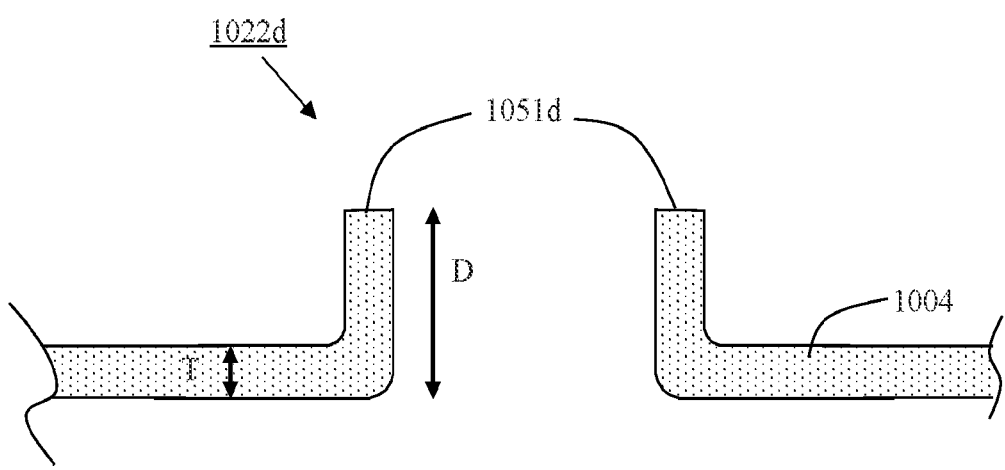
FIGS. 10D-10H are cross-sectional views of some non-limiting examples of reinforced mounting holes with raised rim structures according to some embodiments.
Figure 10E:
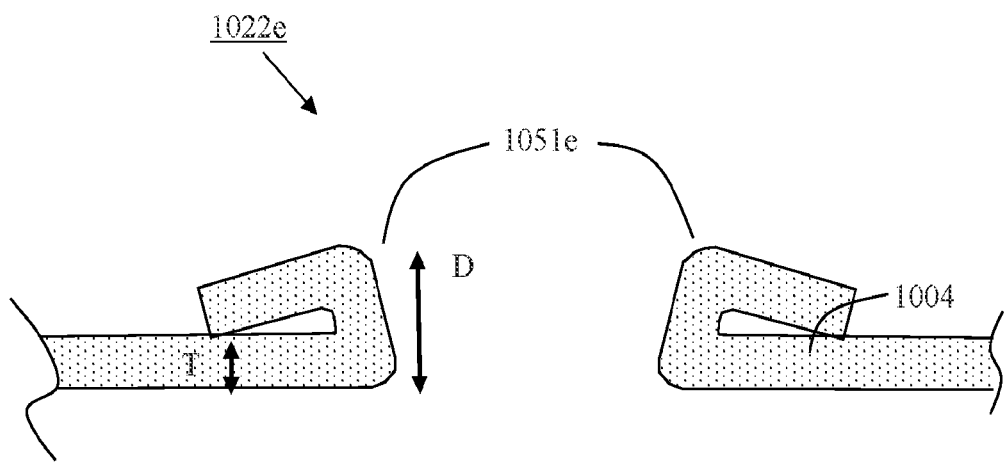
Figure 10F:
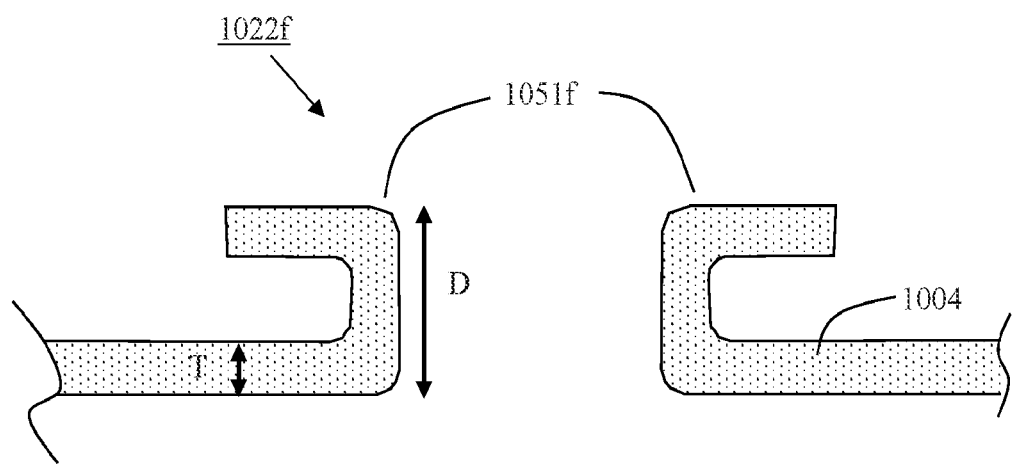
Figure 10G:
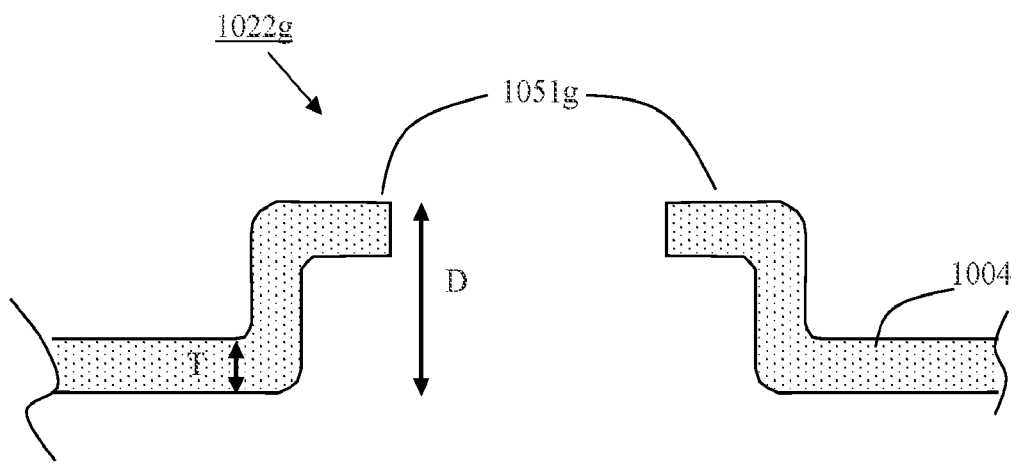
Figure 10H:
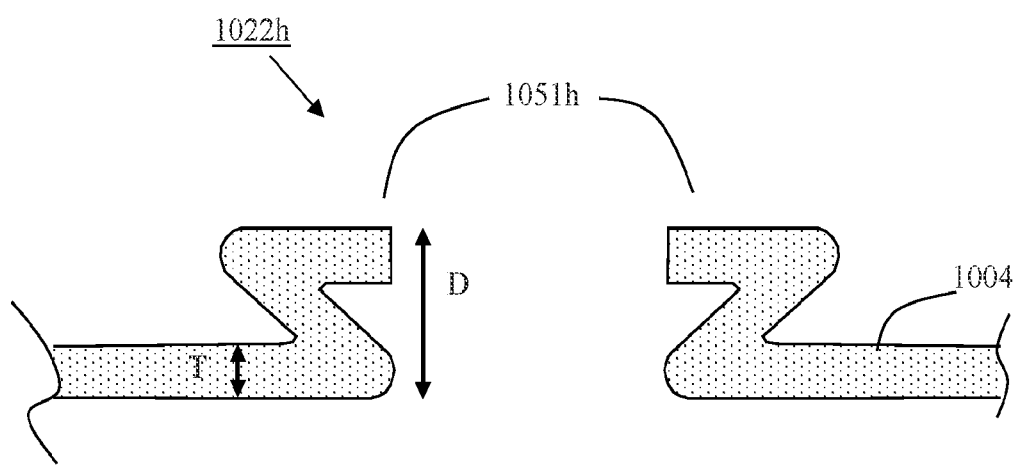

In some embodiments, the raised rim structure may not necessarily be provided around the entire perimeter of the reinforced mounting hole. For example, FIG. 10C is a perspective view of a cutaway portion of a non-limiting example of a frame section or frame precursor structure having a reinforced mounting hole 1022c according to some embodiments. FIG. 10C is similar to FIG. 10A except that the raised rim structure 1051c can be provided on either side of an oblong opening. In some embodiments, depth D of the opening of the reinforced mounting hole may be larger than thickness T of the framework material in at least one cross-sectional dimension, but not necessarily in all cross-sectional dimensions.

FIGS. 10D-10H are cross-sectional views of just a few non-limiting examples of reinforced mounting holes (1022d, 1022e, 1022f, 1022g, 1022h) with raised rim structures (1051d, 1051e, 1051f, 1051g, 1051h) according to some embodiments.

Figure 11A:
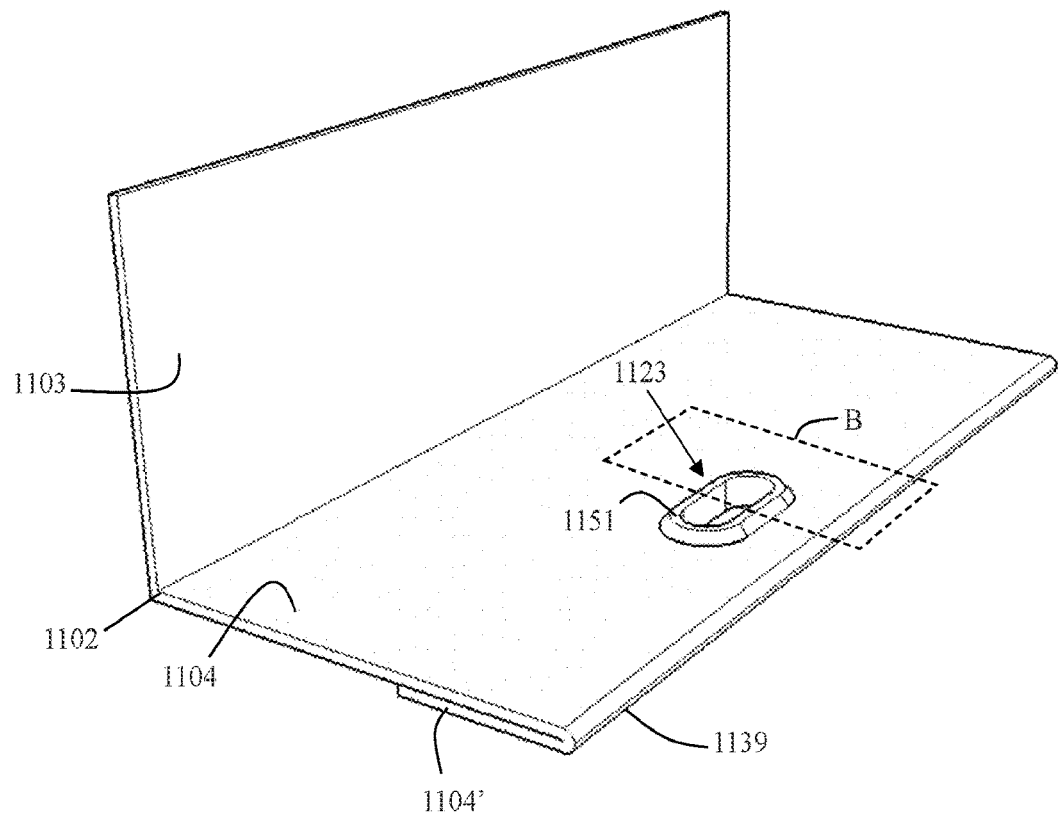
FIG. 11A is a perspective view of a cutaway portion of a non-limiting example of a frame section or frame precursor structure having a reinforced mounting hole according to some embodiments.
Figure 11B:
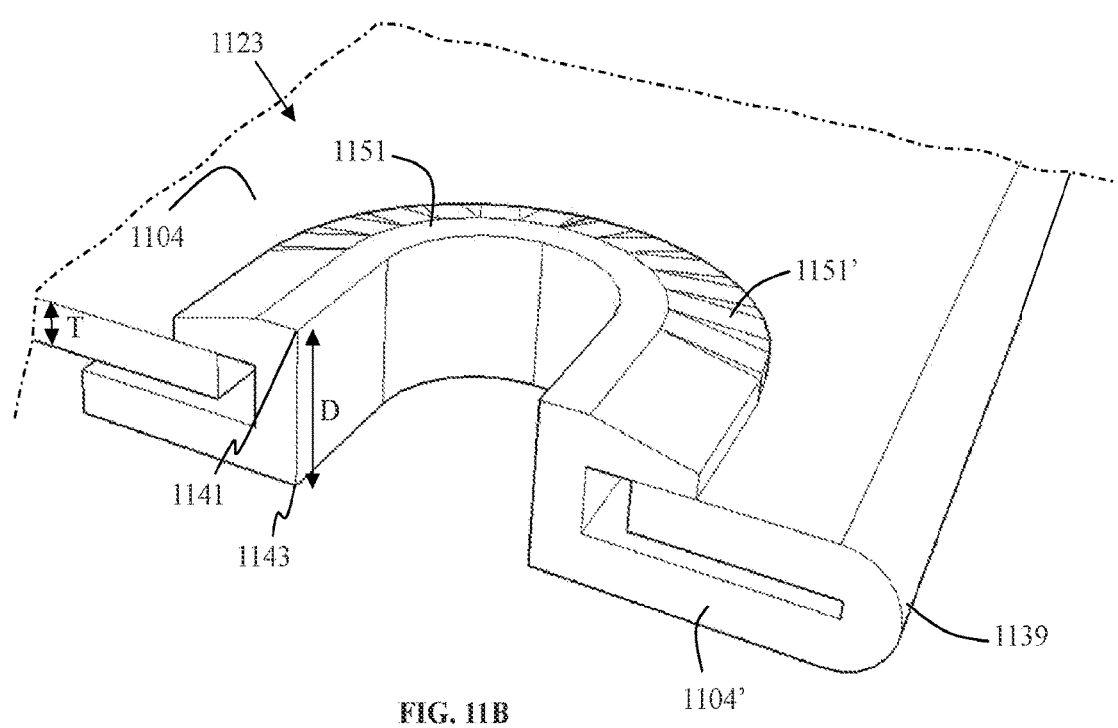
FIG. 11B is a perspective view of a cutaway subsection corresponding to box B of FIG. 11A illustrating a non-limiting example of a frame section or frame precursor structure having a reinforced mounting hole according to some embodiments.

In some embodiments, a reinforced mounting hole may include both multiple layers of framework material and a raised rim structure. FIG. 11A is a perspective view of a cutaway portion of a non-limiting example of a frame section or frame precursor structure having a reinforced mounting hole according to some embodiments. FIG. 11B is a perspective view of a cutaway subsection corresponding to box B of FIG. 11A illustrating a non-limiting example of a frame section or frame precursor structure having a reinforced mounting hole according to some embodiments. The frame or frame precursor structure may include a framework material characterized by an average thickness T and which has been cut and folded into a desired shape. A frame section or frame precursor structure may include a lengthwise fold 1102 that may define an intersection of a frame sidewall 1103 with a bottom flange 104. For clarity, other features, including but not limited to a panel containment structure, that may be part of the frame or frame precursor structure are not shown. The frame section or frame precursor may include a reversing flange fold 1139 such that a portion 1104' of the bottom flange may be folded underneath bottom flange 1104 to form a double layer of framework material. A reinforced mounting hole 1123 may be formed in bottom flange 1104, 104' and may further include a raised rim structure 1151. In some embodiments, the raised rim structure may include a taper 1151'. In some embodiments, a raised rim structure may be formed from the framework material of bottom flange portion 1104' that is, perhaps using an appropriate tool, pushed up and through an opening in bottom flange 1104. Optionally a taper or other top feature may also be formed. The opening of the reinforced mounting hole may have a depth D that may correspond to the distance between the uppermost 1141 and lowermost 1143 edges of the reinforced mounting hole (which may correspond to the top of raised rim structure 1151 and the bottom of bottom flange portion 1104, respectively). Depth D may be greater than the average thickness T of the framework material. In some embodiments, the bottom flange 1104 may be described as a first layer of framework material having a first layer opening, the bottom flange portion 1104' may be described as a second layer of framework material having a second layer opening in functional alignment with the first opening, and the raised rim structure 1151 may be characterized as formed at least in part from the second layer of framework material which extends through the first layer opening. In some embodiments, the reinforcement and increased depth may be achieved by combining multiple layers of framework material at the reinforced mounting hole location with raised rim structure features.

In some embodiments, the raised rim structure may act to align and/or lock in place a first layer of framework material with a second layer of framework material. In some embodiments, and with reference to FIGS. 13A-13D, the structure of 1123 may act as a frame alignment structure without necessarily being used as a reinforced mounting hole in conjunction with a support structure. In some embodiments, the structure of 1123 may act as a locking feature to bind or engage a first layer of framework material with a second layer of framework material, without necessarily being used as a reinforced mounting hole in conjunction with a support structure.

In some embodiments, a reinforced mounting hole may include a raised rim formed in the second layer of framework material that extends through at least a portion of an opening in the first layer of framework material, but which does not extend higher than the top surface of the first layer of framework material. In some embodiments, a raised rim structure may be formed from the first layer of framework material instead of, or in addition to, being formed from the second layer of framework material. In some embodiments, a raised rim structure may be formed or partially formed at a roll forming station. In some embodiments, a raised rim structure may be formed or partially formed at a post process station.

FIGS. 12A-12K are perspective views of cutaway portions of some non-limiting examples reinforced mounting holes that provided in a frame section or frame precursor structure according to some embodiments. For example, the reinforced mounting holes may be provided in a bottom flange, a frame sidewall, or some other frame section feature. For clarity, part numbers are generally not shown, but the various features and functions are self-evident based on the disclosure herein.

Figure 12A:
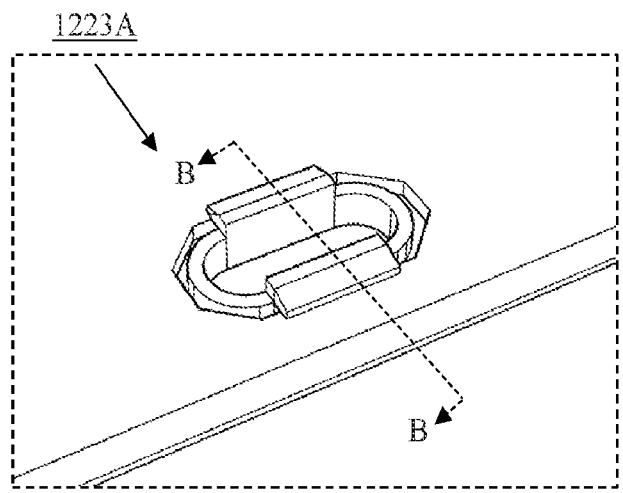
FIGS. 12A-12K are perspective views of cutaway portions of some non-limiting examples of reinforced mounting holes provided in a frame section or frame precursor structure according to some embodiments.
Figure 12B:
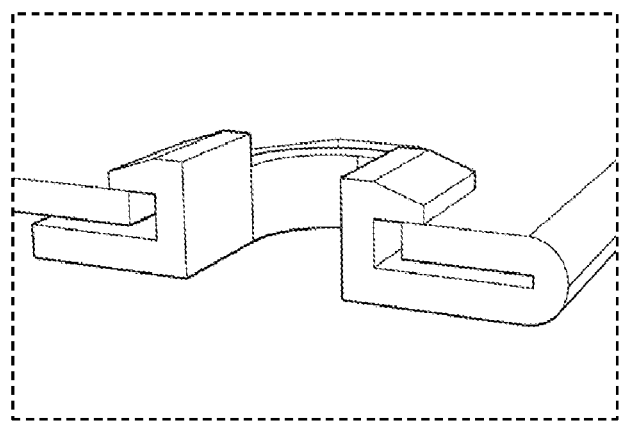
Figure 12C:
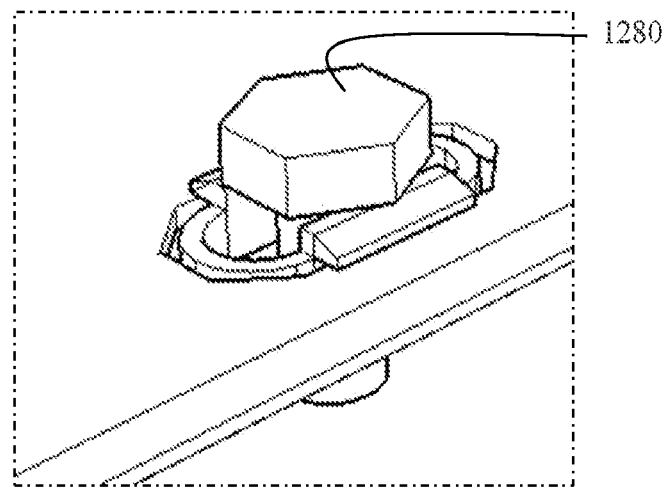

In FIG. 12A, the reinforced mounting hole 1223A may include a raised rim structure such that the raised portion does not extend fully around an opening in a first layer of framework material but may be provided on opposite sides of the opening, for example, along the longer edges of the opening. The raised rim structure 1223A may be formed at least in part from the second layer of framework material which extends through the first layer opening. FIG. 12B is a view of the reinforced mounting hole from FIG. 12A along cut line B-B to help illustrate the construction. FIG. 12C is a view of the reinforced mounting hole from FIG. 12A that further illustrates a bolt 1280 provided through the opening, for example, to a support structure. The reinforced mounting hole may provide additional strength to the frame at the interface of the bolt or other attachment feature.

Figure 12D:
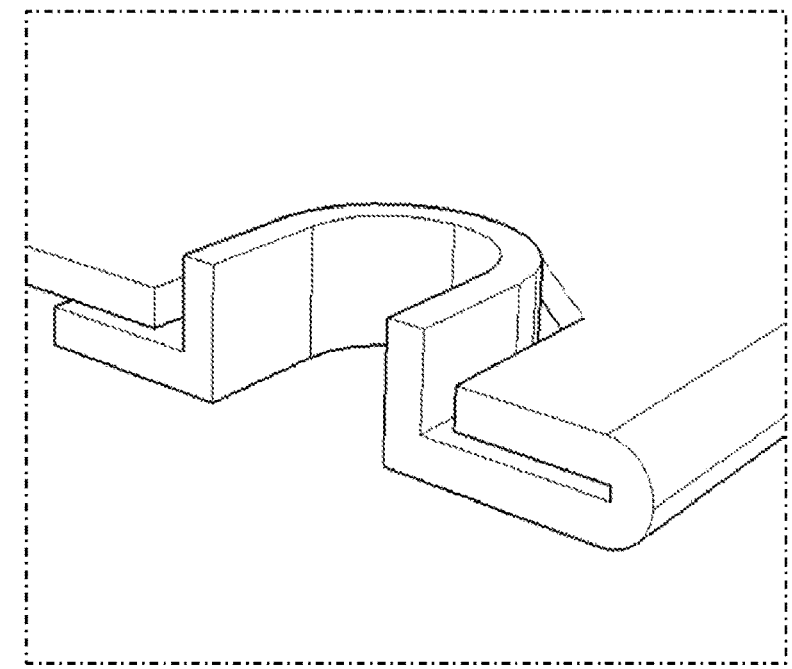

In FIG. 12D a reinforced mounting hole 1223D may include a raised rim formed in the second layer of framework material that extends through and above at least a portion of an opening in the first layer of framework material, but may not be shaped to form a taper or pushed in contact with surface of the first layer of framework material.

Figure 12E:
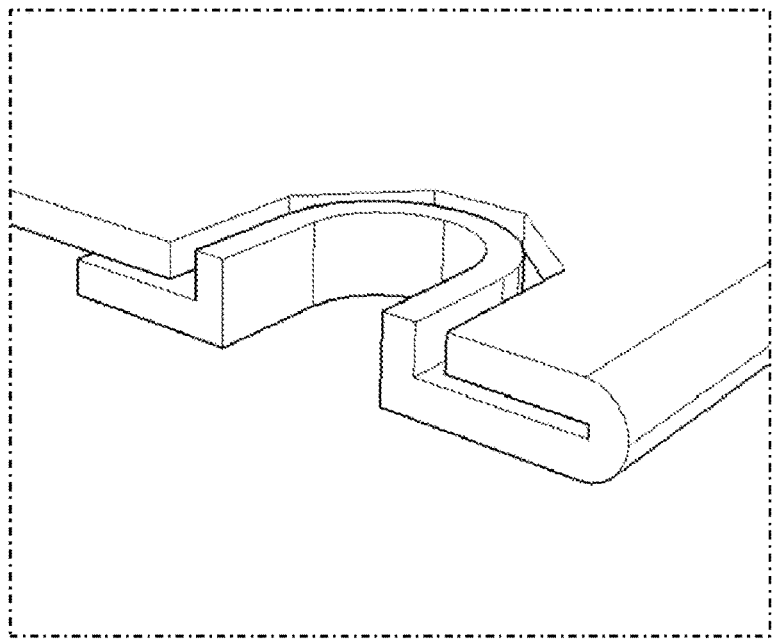

In FIG. 12E a reinforced mounting hole 1223E may include a raised rim formed in the second layer of framework material that extends through at least a portion of an opening in the first layer of framework material, but which may not extend higher than the top surface of the first layer of framework material.

Figure 12F:
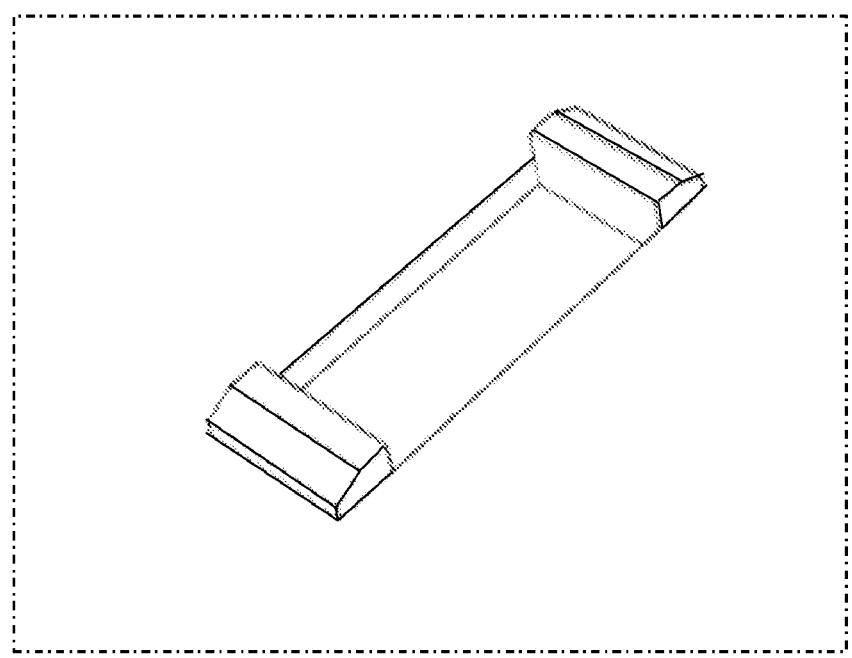

In FIG. 12F, a reinforced mounting hole 1223F may include a raised rim structure formed from a single layer of framework material where the raised rim portion can be provided at the short edges of a rectangular opening in framework material.

Figure 12G:
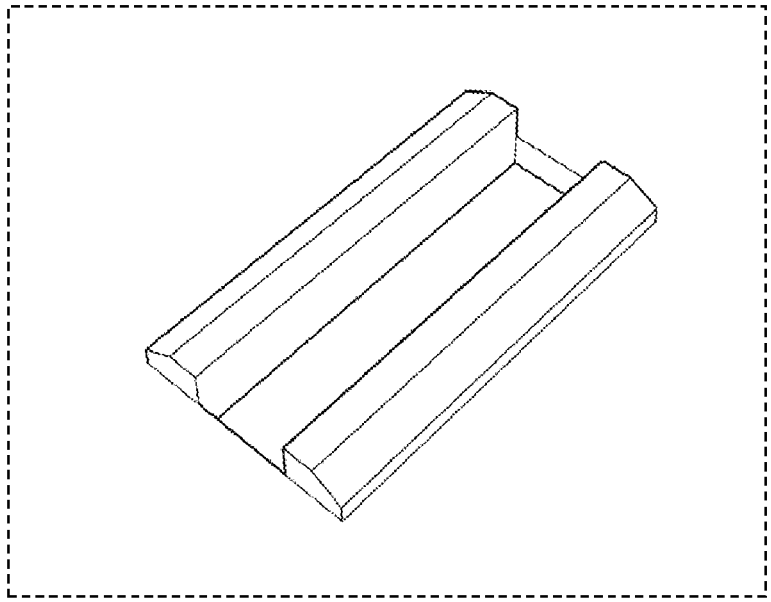

In FIG. 12G, a reinforced mounting hole 1223G may include a raised rim structure formed from a single layer of framework material where the raised rim portion can be provided at the long edges of a rectangular opening in framework material.

Figure 12H:
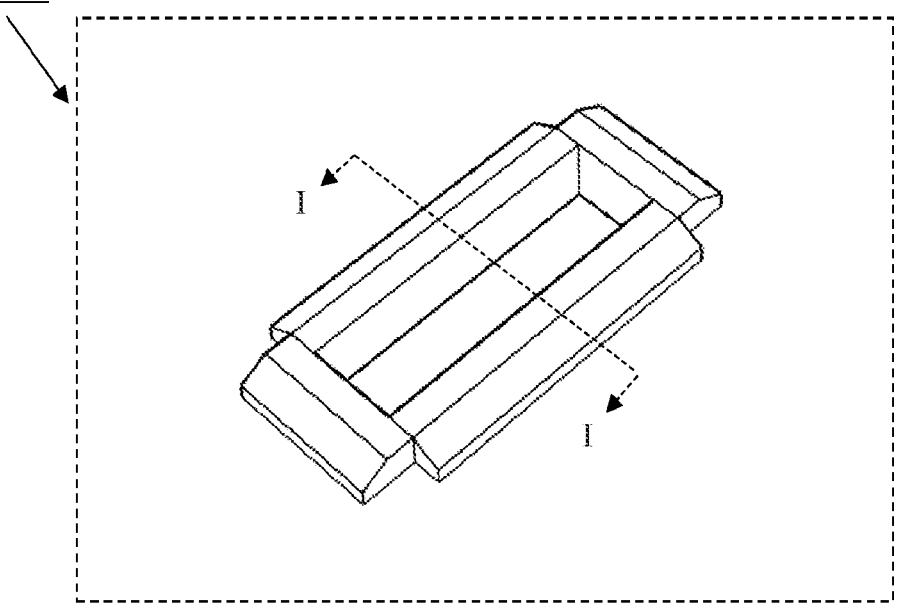

In FIG. 12H, a reinforced mounting hole 1223H may include a raised rim structure formed from a single layer of framework material where the raised rim portion can be provided at the short edges and at the long edges of a rectangular opening in framework material.

Figure 12I:
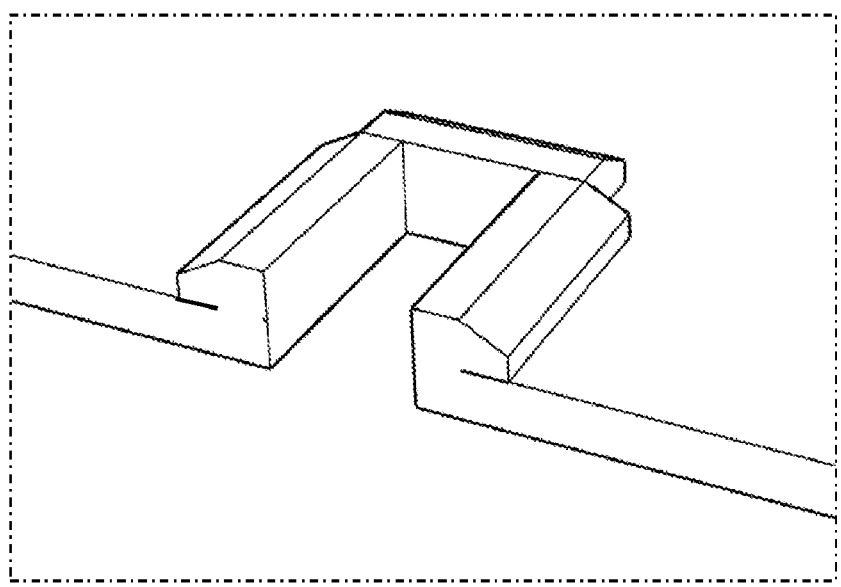

FIG. 12I is a view of the reinforced mounting hole from FIG. 12H along cut line I-I to help illustrate the construction in some embodiments.

Figures 12J, 12K:
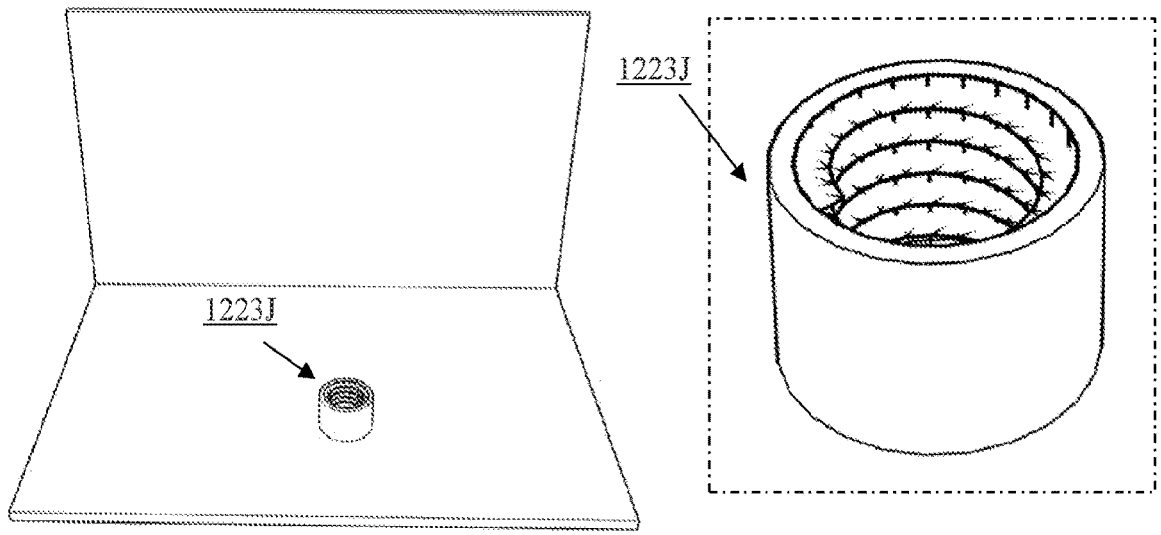

In FIG. 12J-12K, a reinforced mounting hole 1223J may include a raised rim structure that can be threaded. In some cases, the threaded raised rim structure may include a substantially round hole. In some embodiments a reinforced mounting hole 1223J may be formed by flow drilling or friction drilling. A threaded reinforced mounting hole may optionally receive a bolt, a screw, or another threaded attachment feature.

Figures 13A, 13B:
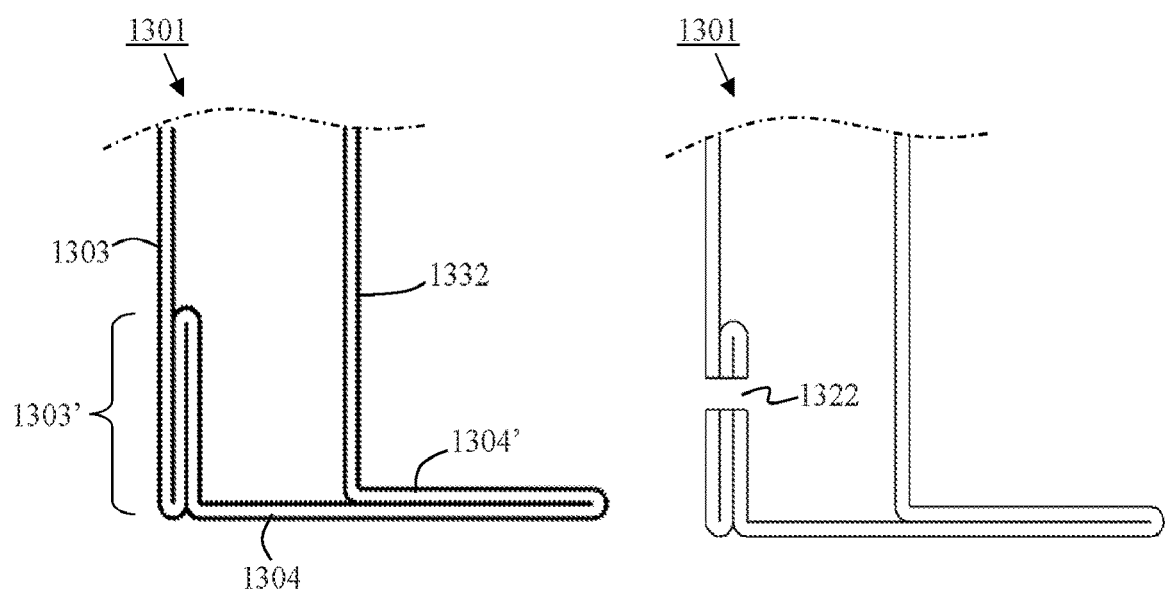
FIGS. 13A-13C are cross-sectional views of non-limiting examples of a frame section or frame precursor structure according to some embodiments.
Figure 13C:
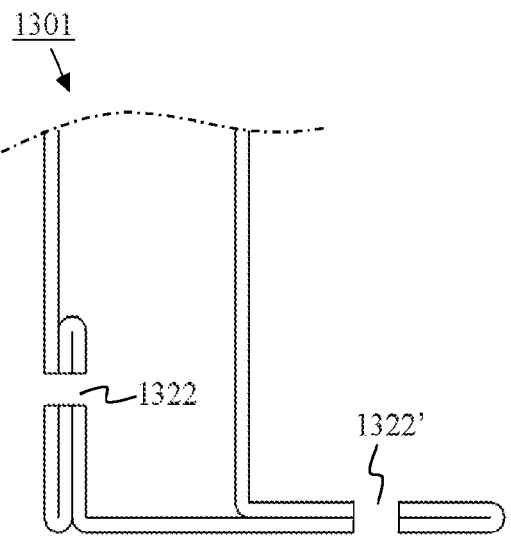

FIGS. 13A-13C are cross-sectional views of non-limiting examples of a frame section or frame precursor structure according to some embodiments. The frame section or frame precursor structure may include a framework material characterized by an average thickness and which has been cut and folded into a desired shape. FIG. 13A is a first cross-sectional view of a frame section or frame precursor 1301 may include a frame sidewall 1303, a portion of which 1303' may include multiple layers of framework material. For example, frame sidewall portion 1303' may include three layers of framework material, but different designs may use two or even more than three layers. Frame section 1301 may further include a bottom flange 1304, a portion of which 1304' may include multiple layers of framework material. For example, bottom flange portion 1304' may include two layers of framework material, but different designs may use three or more layers. In some embodiments, frame section or frame precursor structure 1301 may include a support wall 1332. The support wall and sidewall may extend to a panel containment structure, not shown here. FIG. 13B may represent the same frame section or frame precursor structure as in FIG. 13A, but the cross-section is taken along a different cut line to show a reinforced mounting hole 1322 provided in the multilayer portion of frame sidewall 1303'. Alternatively, FIG. 13C may represent the same frame section or frame precursor structure as in FIG. 13A, but the cross-section is taken along a different cut line to show a reinforced mounting hole 1322 provided in the multilayer portion of frame sidewall 1303' in addition to a reinforced mounting hole 1322' provided in the multilayer portion of bottom flange 1304'. Note that, in some embodiments, a frame section or frame precursor structure may include one or more reinforced mounting holes in the frame sidewall along with one or more reinforced mounting holes in the bottom flange, but they may be positioned in a manner so that frame sidewall reinforced mounting hole may not be along the same axis as the bottom flange reinforced mounting holes.

Figure 14A:
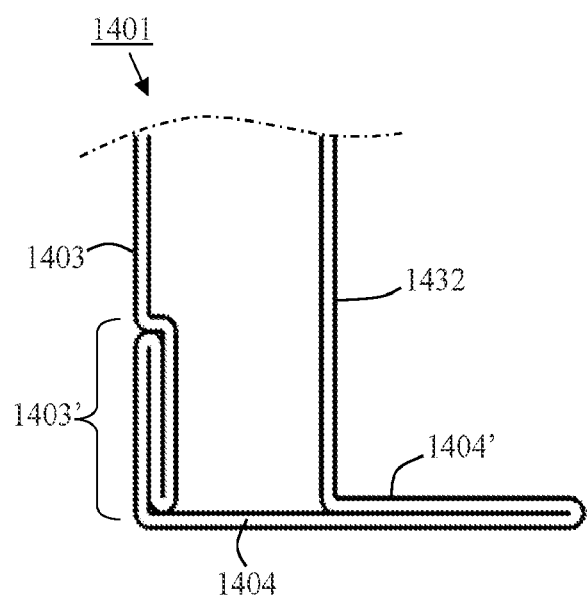
FIGS. 14A and 14B are cross-sectional views of non-limiting examples of a frame section or frame precursor structure according to some embodiments.
Figure 14B:
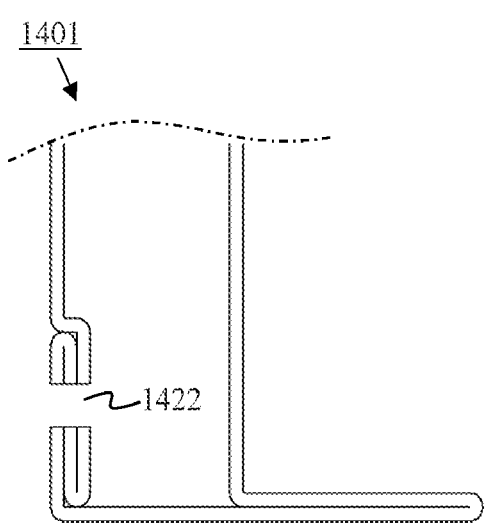

FIGS. 14A and 14B are cross-sectional views of non-limiting examples of a frame section or frame precursor structure according to some embodiments. The frame section or frame precursor structure may include a framework material characterized by an average thickness and which has been cut and folded into a desired shape. FIG. 14A is a first cross-sectional view of a frame section or frame precursor 1401 may include a frame sidewall 1403, a portion of which 1403' may include multiple layers of framework material. For example, frame sidewall portion 1403' may include three layers of framework material, but different designs may use two or even more than three layers. Frame section 1401 may be similar to frame section 1301 of FIG. 13A except that the frame sidewall may be designed with a different set of folds, as shown. Frame section 1401 may further include a bottom flange 1404, a portion of which 1404' may include multiple layers of framework material. For example, bottom flange portion 1404' may include two layers of framework material, but different designs may use three or more layers. In some embodiments, frame section or frame precursor structure 1401 may include a support wall 1432. The support wall and sidewall may extend to a panel containment structure, not shown here. FIG. 14B may represent the same frame section or frame precursor structure as in FIG. 14A, but the cross-section is taken along a different cut line to show a reinforced mounting hole 1422 provided in the multilayer portion of frame sidewall 1403'. Although not shown, frame section or frame precursor 1401 may further include one or more reinforced mounting holes provided in the bottom flange, e.g., as described with respect to FIGS. 13A-13C. Note that any of the reinforced mounting holes of FIGS. 13A-14B may have a raised rim structure as described elsewhere herein. In some embodiments, for example in a manner similar to that described with respect to FIGS. 12A-12E, one of the layers of framework material of the multilayer frame sidewall of frame section 1301 or 1401 may extend partially or entirely through the opening formed from the other layer(s) of framework material. In some cases, such extension of framework material may increase the strength of the frame against vertical forces acting on the frame sidewall near the hole. In some embodiments where a frame sidewall includes a reinforced mounting hole, a support wall may include multiple layers of framework material to increase the strength of the frame.

A reinforced mounting hole may assume any functional shape that may be symmetrical or asymmetrical. A reinforced mounting hole shape may include, but is not limited to, circular square, rectangular, oblong, oval, dog-bone, dumbbell, star, pentagonal, hexagonal, some other shape, such as a polygon, or the like. In some embodiments, at attachment feature may be screwed into a threaded reinforced mounting hole from underneath the bottom flange or outside the frame sidewall, which may eliminate or reduce the need for additional hardware (e.g., nuts), which may in turn may provide assembly benefits when the reinforced mounting hole may be in difficult-to-access portion of the frame.

A frame section or frame precursor structure may include more than one reinforced mounting holes. A frame section or frame precursor structure may include multiple types of reinforced mounting holes. A frame section or frame precursor structure may include one or more reinforced mounting holes along with one or more non-reinforced mounting holes. In some embodiments, a reinforced mounting hole may be used as a reinforced access hole 823 for wiring, tools, testing devices, or other elements useful for the operation or construction of the framed panel structure. Such uses may be instead of, or in addition to, mounting to a support structure. Unless noted otherwise, any disclosure of a reinforced mounting hole herein may apply to a reinforced access hole.

Figure 15A:
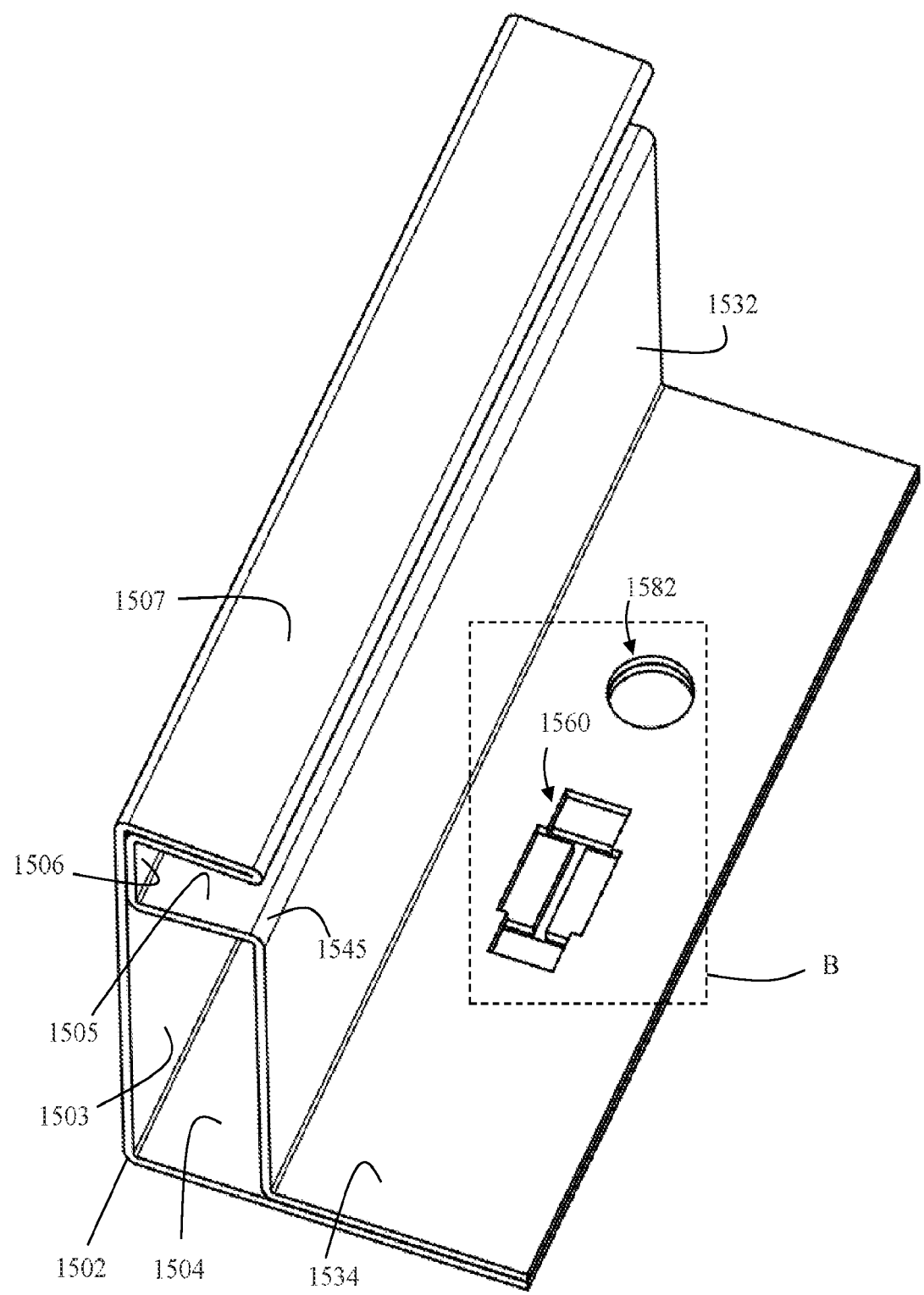
FIG. 15A is a perspective view of a cutaway portion of a non-limiting example of a frame section or frame precursor structure having a frame alignment precursor according to some embodiments.
Figure 15B:
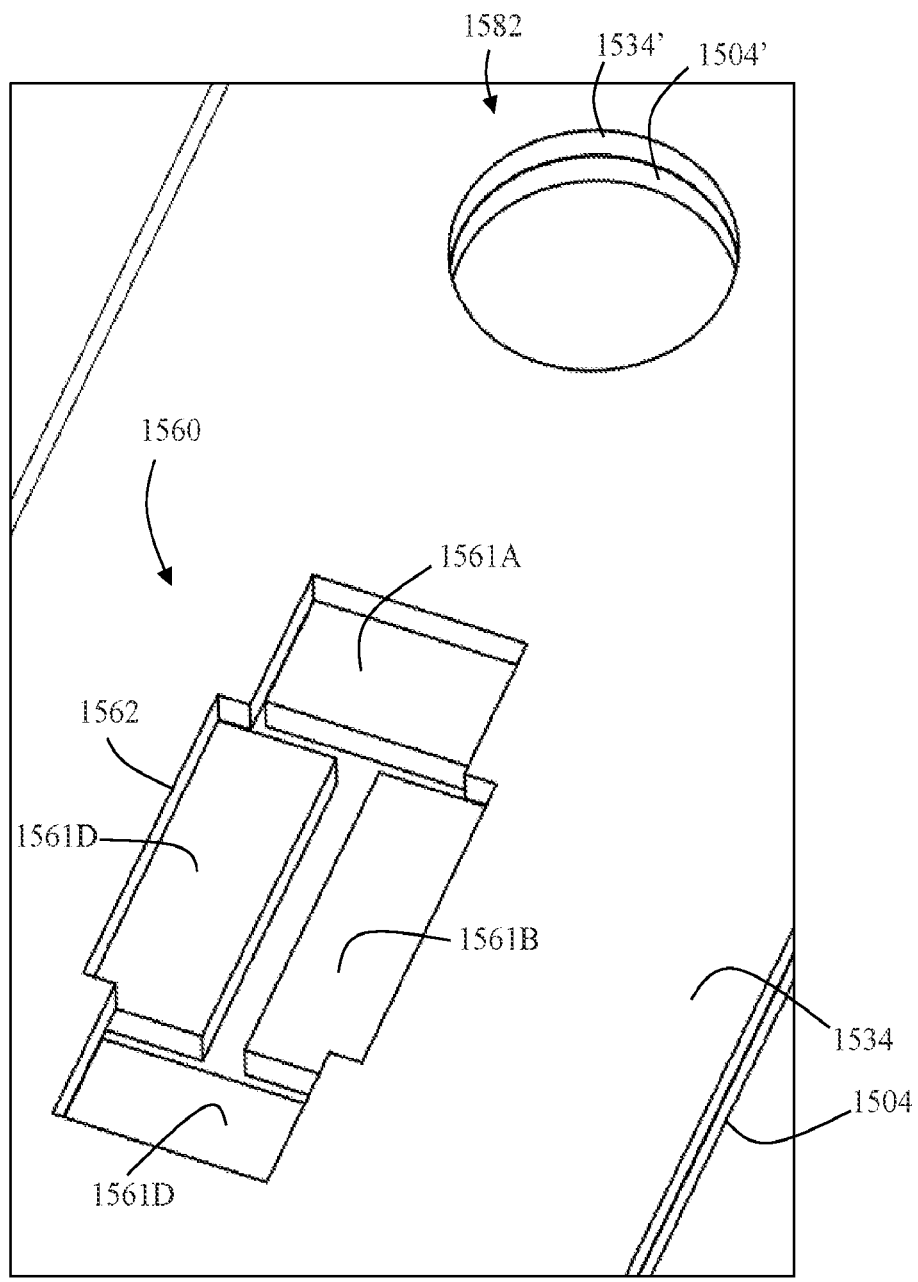
FIG. 15B is a perspective view of a cutaway subsection corresponding to box B of FIG. 15A illustrating a non-limiting example of a frame section or frame precursor structure having a frame alignment precursor according to some embodiments.

In some embodiments, structural features used to form reinforced mounting holes may instead, or in addition, be used to form a frame alignment structure. FIG. 15A is a perspective view of a cutaway portion of a non-limiting example of a frame section or frame precursor structure having a frame alignment precursor according to some embodiments. FIG. 15B is a perspective view of a cutaway subsection corresponding to box B of FIG. 15A. The frame section or frame precursor structure may include a framework material characterized by an average thickness and which has been cut and folded into a desired shape. The frame section or frame precursor structure may include a lengthwise fold 1502 that may define an intersection of a frame sidewall 1503 with a bottom flange 1504. The frame section or frame precursor structure may include a series of folds to form a panel containment structure that may include a lower shelf 1505, a pocket wall 1506, a top lip 1507, and perhaps even a pocket region (not labelled). The frame section or frame precursor structure may include a lengthwise fold 1545 that may define an intersection of the lower shelf 1505 and a support wall 1532. The support wall may extend from the lower shelf 1505 to, and may engage with, the bottom flange 1504. Such engagement may include embodiments where at least a portion of the support wall may be held in place, e.g., by friction, geometry, spring forces, locking features, crimping, clinching, welding, adhesives, or the like. The support wall may provide additional structural stability to the frame. The support wall may include an end flange 1534 that may be flush with the bottom flange 1504. The frame section or frame precursor structure may include a frame alignment precursor 1560, which may include a notched alignment opening 1562 provided in end flange 1534, and four alignment tabs 1561A, 1561B, 1561C, and 1561D, cut into bottom flange 1504. In some embodiments, the one or more alignment tabs may include tapered edges. As a non-limiting example, the short edges of one or more alignment tabs may be tapered. In some embodiments, end flange 1534 may be characterized as a first layer of framework material and bottom flange 1504 may be characterized as a second layer of framework material.

In some embodiments, the frame section or frame precursor structure may include a feature 1582 that may benefit from proper frame alignment, or alternatively be used to monitor frame alignment. In some embodiments, feature 1582 may include a first pattern 1534' in a first layer of framework material (e.g., an opening in end flange 1534) that may be intended to align to a second pattern 1504' in a second layer of framework material (e.g., an opening in bottom flange 1504). FIGS. 15A-15D illustrate two circular holes, but the patterns may take any shape useable for the intended function. For example, one or both of the first and second patterns may be circular, oval, square, rectangular, star-shaped, cross-shaped, or any other shape. The first and second patterns may be the same or different. In some embodiments, only one of the first or second pattern includes an opening and the other pattern can be provided as some other mark in or on the framework material visible through the opening. In some embodiments, feature 1582 may be used as a reinforced mounting hole. Alternatively, the first and second patterns of feature 1582 may be used as an access hole for wiring, tools, testing devices, or other elements useful for the operation or construction of the framed panel structure. Alternatively, the first and second patterns of feature 1582 may act as an alignment fiducial mark that may be monitored to ensure quality control.

Figure 15C:
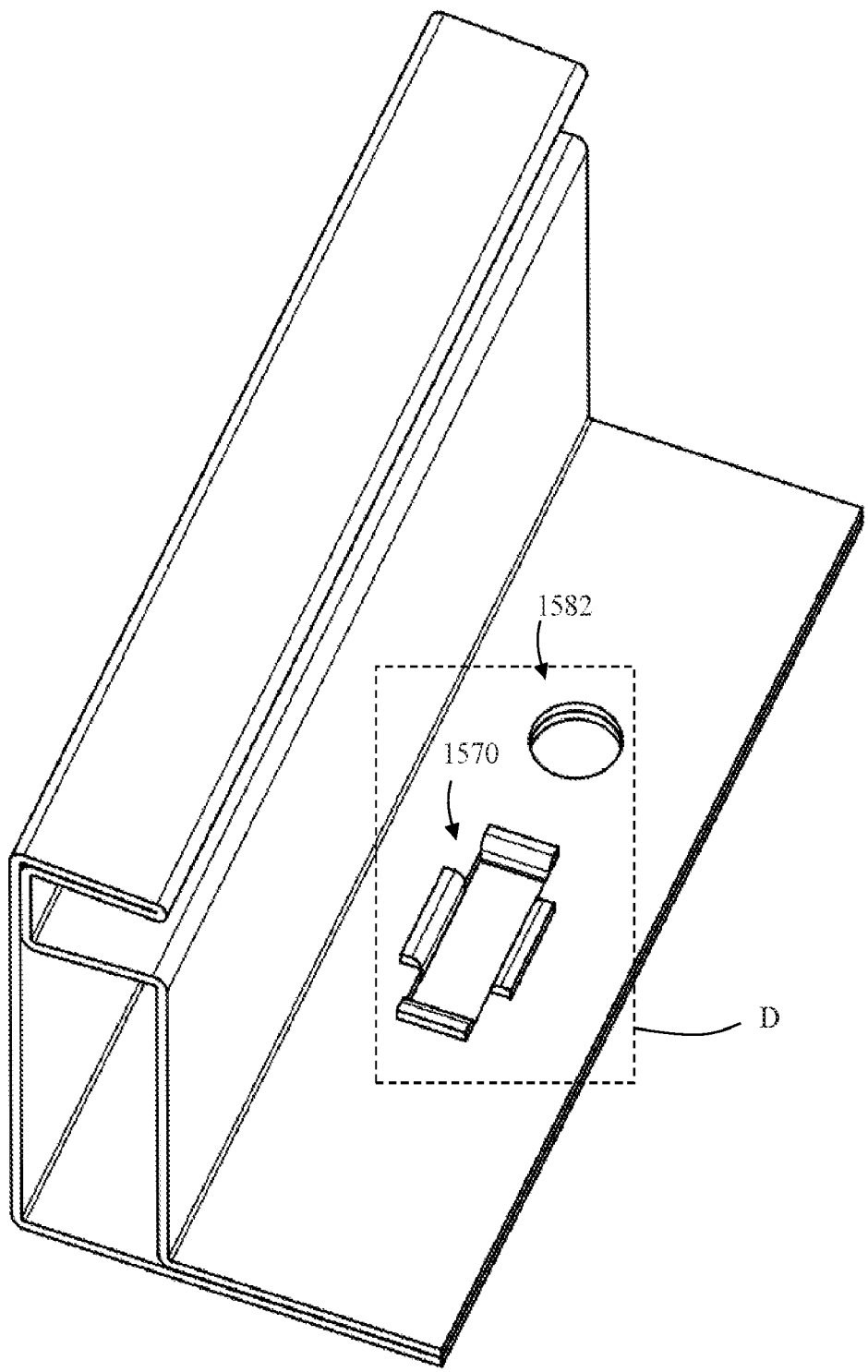
FIG. 15C is a perspective view of a cutaway portion of a non-limiting example of a frame section or frame precursor structure having a frame alignment structure according to some embodiments.
Figure 15D:
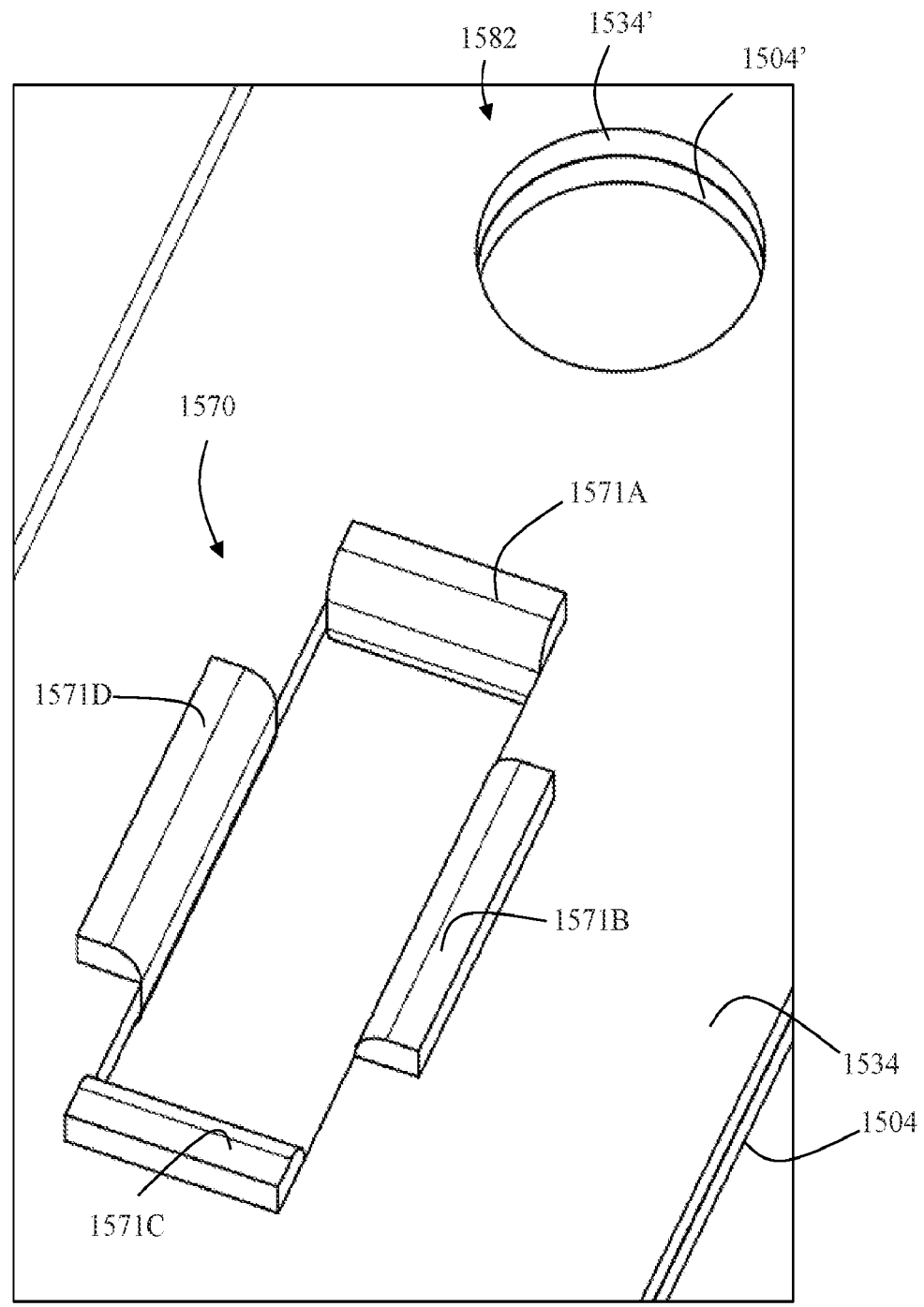
FIG. 15D is a perspective view of a cutaway subsection corresponding to box D of FIG. 15C illustrating a non-limiting example of a frame section or frame precursor structure having a frame alignment structure according to some embodiments.

FIG. 15C is a perspective view of a cutaway portion of a non-limiting example of the frame section or frame precursor structure from FIG. 15A after forming a frame alignment structure according to some embodiments. FIG. 15D is a perspective view of a cutaway subsection corresponding to box D of FIG. 15C. In some embodiments, one or more alignment tabs provided in bottom flange 1504 (perhaps a second layer of framework material) may be folded up through the alignment opening and optionally folded over the end flange (perhaps a first layer of framework material) to form a frame alignment structure. For example, frame alignment feature 1570 may include folded tabs 1571A, 1571B, 1571C, and 1571D. In some embodiments, the folded tabs may fit into the notched alignment hole with high accuracy which may aid the alignment of other frame features, including but limited to, feature 1582. By folding back one or more tabs over the end flange 1534 (perhaps a first layer of framework material), the frame alignment structure 1570 may also act as a locking or even bonding feature such that the first layer of framework material may engage or bond with the second layer of framework material in this portion of the frame section or frame precursor structure. Such locking or bonding features may add additional structural strength to the frame. Additional engagement or bonding features may optionally be used together with the frame alignment structure to secure or lock the internal structure or geometry of the frame. Frame alignment structure 1570 may in some embodiments act as a reinforced mounting hole where the folded tabs may correspond to a raised rim structure.

Although FIGS. 15C and 15D show a frame alignment structure having folded tabs extending upward from the second layer of framework material through the first layer of framework material, in some embodiments, the first layer of framework material may include the alignment tabs and the second layer may include the alignment opening. In some embodiments, a frame alignment structure may be provided in association with the frame sidewall in addition to, or instead of, the bottom flange.

FIGS. 15A-15D show tabs but these could be any push-in feature in the second layer of framework material that extends into the alignment opening of the first layer of framework material. At least one push-in feature may contact or be in close proximity to the alignment opening edge or edges which may align the bottom flange 1504 (perhaps a second layer of framework material) with the end flange 1534 (perhaps a first layer of framework material) and may prevent the bottom flange 1504 (perhaps a second layer of framework material) and the end flange 1034 (perhaps a first layer of framework material) from moving or sliding relative to each other. In some embodiments, a push-in feature may extend only partway into the alignment opening. In some embodiments, a push-in feature may extend through the alignment opening and be approximately flush with the surface of the first layer of framework material. In some embodiments, a push-in feature may extend through the alignment opening and beyond the plane of the surface of the first layer of framework material. In some embodiments, a push-in feature may be folded over a portion of the first layer of framework material.

In some embodiments, an alignment structure 1570, a reinforced mounting hole 822, or a reinforced access hole 823 may be provided in a support wall, either alone or in combination with one or more of such features provided in a bottom flange and/or a frame sidewall.

Although described herein with respect to their utility in making frames for solar panels, the methods, equipment, and devices of the present application may be used to manufacture many other products in many other fields. In some cases, such other products may be those formed at least in part from a generally flat starting material including, but not limited to, sheet metal (coated or uncoated).

It should be noted that various parts and frame features, including but not limited to, frame sidewalls and bottom flanges, have generally be represented in their respective figures as being straight or flat, but in some embodiments, one or more of these features (or other features shown as being straight or flat) may instead be non-straight or non-flat. For example, one or more of these features may include one or more curves or additional bends and still effectively perform their intended function.

Note also that in any of the figures herein, folds that may be represented as having sharp corners may be replaced with rounded corners. In some embodiments, a corner formed by a fold may be characterized by a bending radius.

In some embodiments, in areas where a portion of framework material may come into contact with another material including, but not limited to, another portion of framework material, a bolt, a washer, a support structure, or the like, such areas may optionally include an anti-corrosion coating or an additional anti-corrosion coating treatment including, but not limited to, those already discussed.

In some embodiments, in areas where multiple layers of framework material are formed, such areas may optionally include a bonding or attachment feature to hold the layers together. Some non-limiting examples of attachment features may include a crimp, a clinch, an interlocking feature between the layers, double-sided adhesive tape, an adhesive, a weld, a braze, a solder, or the like. In some embodiments, an anticorrosion coating may also have adhesive properties and act as an attachment feature.

Still further embodiments herein include the following enumerated embodiments. The terms "including" (and its variations, "includes", "include") in these enumerated embodiments encompasses its normal meaning in addition to "comprising" ("comprises", "comprise") and/or "consisting of" ("consists of", "consist of") and/or "consisting essentially of" ("consists essentially of", consist essentially of").

Enumerated embodiment 1. A frame for supporting a solar panel, the frame including at least a first frame section including:
- a bottom flange provided at a base of the first frame section;
- a frame sidewall provided at an outer portion of the first frame section, the frame sidewall including a height extending from the bottom flange;
- a panel containment structure at an upper portion of the frame sidewall, the panel containment structure including a lower shelf extending from the sidewall; and
- one or more reinforced mounting holes provided in the bottom flange, in the frame sidewall, or both in the bottom flange and in the frame sidewall, wherein the bottom flange, frame sidewall, and panel containment structure are formed at least in part from folds provided in a single piece of first framework material, the first framework material including an average thickness, and wherein the one or more reinforced mounting holes include an opening having a depth greater than the framework thickness.

Enumerated embodiment 2. The frame of enumerated embodiment 1 or any other enumerated embodiment, wherein at least one of the one or more reinforced mounting hole includes a first layer of framework material including a first-layer opening, and a second layer of framework material including a second-layer opening in functional alignment with the first-layer opening.

Enumerated embodiment 3. The frame of enumerated embodiment 2 or any other enumerated embodiment, wherein the at least one reinforced mounting hole includes a third layer of framework material including a third-layer opening in functional alignment with the first- and second-layer openings.

Enumerated embodiment 4. The frame of enumerated embodiment 2 or 3 or any other enumerated embodiment, wherein the at least one reinforced mounting hole is provided in the bottom flange and wherein the first layer or second layer is formed from a reversing flange fold.

Enumerated embodiment 5. The frame of enumerated embodiment 2 or 3 or any other enumerated embodiment, wherein the at least one reinforced mounting hole is provided in the bottom flange and wherein the first layer and second layer are formed from other than a reversing flange fold.

Enumerated embodiment 6. The frame of enumerated embodiment 4 or 5 or any other enumerated embodiment, further including a reinforced mounting hole provided in the frame sidewall.

Enumerated embodiment 7. The frame of enumerated embodiment 2 or 3 or any other enumerated embodiment, wherein the at least one reinforced mounting hole is provided in the frame sidewall.

Enumerated embodiment 8. The frame according to any of enumerated embodiments 1-7 or any other enumerated embodiment, wherein at least one of the one or more reinforced mounting hole includes a raised rim structure at least partially around a perimeter of the opening.

Enumerated embodiment 9. The frame of enumerated embodiment 8 or any other enumerated embodiment, wherein the raised rim structure further includes a taper.

Enumerated embodiment 10. The frame of enumerated embodiment 8 or 9 or any other enumerated embodiment, wherein the raised rim structure is formed of the first framework material.

Enumerated embodiment 11. The frame according to any of enumerated embodiments 1-10 or any other enumerated embodiment, wherein at least one of the one or more reinforced mounting hole includes:
- a first layer of the first framework material including a first layer opening;
- a second layer of the first framework material including a second layer opening in functional alignment with the first layer opening; and
- a raised rim structure at least partially around a perimeter the first layer opening.

Enumerated embodiment 12. The frame of enumerated embodiment 11 or any other enumerated embodiment, wherein the raised rim structure is formed at least in part from the second layer of the first framework material which extends through the first layer opening.

Enumerated embodiment 13. The frame of enumerated embodiment 11 or 12 or any other enumerated embodiment, wherein the raised rim structure is formed at least in part from the first layer of the first framework material.

Enumerated embodiment 14. The frame according to any of enumerated embodiments 11-13 or any other enumerated embodiment, wherein the raised rim structure further includes a taper.

Enumerated embodiment 15. The frame according to any of enumerated embodiments 1-14 or any other enumerated embodiment, wherein the panel containment structure further includes a pocket wall extending from the lower shelf and approximately parallel to the frame sidewall, wherein the pocket wall is formed at least in part from the first framework material.

Enumerated embodiment 16. The frame of enumerated embodiment 15 or any other enumerated embodiment, wherein the panel containment structure further includes a top lip extending from the top of the pocket wall, wherein the top lip is formed at least in part from the first framework material.

Enumerated embodiment 17. The frame according to any of enumerated embodiments 1-15 or any other enumerated embodiment, wherein the panel containment structure does not include a top lip.

Enumerated embodiment 18. The frame according to any of enumerated embodiments 1-17 or any other enumerated embodiment, wherein the lower shelf includes multiple layers of the first framework material.

Enumerated embodiment 19. The frame according to any of enumerated embodiments 1-17 or any other enumerated embodiment, wherein the lower shelf does not include multiple layers of the first framework material.

Enumerated embodiment 20. The frame according to any of enumerated embodiments 1-19 or any other enumerated embodiment, further including a support wall extending between the panel containment structure and the bottom flange.

Enumerated embodiment 21. The frame of enumerated embodiment 20, wherein the support wall includes one or more reinforced mounting holes.

Enumerated embodiment 22. The frame according to any of enumerated embodiments 1-19 or any other enumerated embodiment, wherein the first frame section does not include a support wall.

Enumerated embodiment 23. The frame according to any of enumerated embodiments 1-22 or any other enumerated embodiment, further including a first corner bend or a first corner joint defining an interface of the first frame section with a second frame section.

Enumerated embodiment 24. The frame of enumerated embodiment 23 or any other enumerated embodiment, wherein the second frame section includes:
- a second bottom flange provided at a base of the second frame section; and
- a second frame sidewall provided at an outer portion of the second frame section, the second frame sidewall including a height extending from the second bottom flange,
- wherein the second bottom flange and second frame sidewall are formed at least in part from folds provided in a single piece of second framework material, the second framework material including an average thickness.

Enumerated embodiment 25. The frame of enumerated embodiment 24 or any other enumerated embodiment, wherein the first frame section and the second frame section are formed at least in part from a common piece of framework material.

Enumerated embodiment 26. The frame of enumerated embodiment 24 or any other enumerated embodiment, wherein the first frame section and the second frame section are formed from separate pieces of framework material.

Enumerated embodiment 27. The frame according to any of enumerated embodiments 23-26 or any other enumerated embodiment, wherein the second frame section includes one or more reinforced mounting holes.

Enumerated embodiment 28. The frame according to any of enumerated embodiments 1-27 or any other enumerated embodiment, wherein the first frame section includes one or more alignment structures in the first frame section.

Enumerated embodiment 29. The frame of enumerated embodiment 28 or any other enumerated embodiment, wherein at least one of the one or more frame alignment structure includes:
- a first layer of first framework material including an alignment opening; and
- a second layer of first framework material proximate the first layer of first framework material and including one or more folded tabs extending through the alignment opening.

Enumerated embodiment 30. The frame of enumerated embodiment 29 or any other enumerated embodiment, wherein the one or more folded tabs are further folded over a portion of the first layer of first framework material.

Enumerated embodiment 31. The frame according to any of enumerated embodiments 28-30 or any other enumerated embodiment, wherein at least one alignment structure includes a reinforced mounting hole.

Enumerated embodiment 32. The frame according to any of enumerated embodiments 1-31 or any other enumerated embodiment, wherein the first framework material includes coated steel.

Enumerated embodiment 33. The frame of enumerated embodiment 32 or any other enumerated embodiment, wherein the coated steel has an average thickness in a range of about 0.7 mm to about 1.4 mm.

Enumerated embodiment 34. A framed panel structure including a frame according to any of enumerated embodiments 1-33 or any other enumerated embodiment and a solar panel provided in association with the panel containment structure of the first frame section.

Enumerated embodiment 35. A solar panel system including the framed panel structure of enumerated embodiment 34 or any other enumerated embodiment, wherein at least one reinforced mounting hole is used to attach the framed panel structure to a support structure.

Enumerated embodiment 36. The solar panel system of enumerated embodiment 35 or any other enumerated embodiment, wherein at least one of the one or more reinforced mounting hole is not used to attach the framed panel structure to a support.

Enumerated embodiment 37. The solar panel system of enumerated embodiment 35 or 36 or any other enumerated embodiment, wherein the at least one of the one or more reinforced mounting hole includes wiring or includes an access point for tooling.

Enumerated embodiment 38. A mounting system including a support structure and the framed panel structure of enumerated embodiment 34 or any other enumerated embodiment, wherein the frame is attached to the support structure using one or more of the reinforced mounting holes.

Enumerated embodiment 39. The mounting system of enumerated embodiment 38 or any other enumerated embodiment, further including an attachment feature.

Enumerated embodiment 40. The mounting system of enumerated embodiment 39 or any other enumerated embodiment, wherein the attachment feature includes a bolt, a flange bolt, a nut, a neo bolt, a lock bolt, a clinch, or a rivet.

Enumerated embodiment 41. The mounting system of enumerated embodiment 39 or any other enumerated embodiment, wherein the attachment feature is part of the support structure.

Enumerated embodiment 42. A method of making a frame according to any of enumerated embodiments 1-33 or any other enumerated embodiment, the method including:
providing framework material to a framework material station;
receiving the framework material at a punching station, wherein the framework material is cut or punched in a predetermined pattern to form a patterned framework material; and
receiving the patterned framework material at a roll forming station, wherein the patterned framework material is folded or bent into a predetermined shape to form a shaped framework material.

Enumerated embodiment 43. The method of enumerated embodiment 42 or any other enumerated embodiment, wherein the shaped framework material includes a frame precursor structure.

Enumerated embodiment 44. The method of enumerated embodiment 42 or any other enumerated embodiment, further including:
receiving the shaped framework material at a post forming station, wherein the shaped framework material is acted on by one or more post forming processes to form a framework precursor structure.

Enumerated embodiment 45. The method of enumerated embodiment 44 or any other enumerated embodiment, wherein the one or more post forming processes include:
cutting the frame precursor structure to a predetermined length;
passing the shaped framework material through straightening rollers;
buffing or deburring the shaped framework material; or
forming a raised rim structure feature.

Enumerated embodiment 46. The method according to any of enumerated embodiments 42-45 or any other enumerated embodiment, wherein the framework material is coated steel.

Enumerated embodiment 47. The method according to any of enumerated embodiments 42-46 or any other enumerated embodiment, wherein the framework material is provided in the form of a roll.

Enumerated embodiment 48. The method according to any of enumerated embodiments 42-47 or any other enumerated embodiment, wherein at least one of the punching station, the roll forming station or the post forming station includes a microprocessor.

Enumerated embodiment 49. The method of enumerated embodiment 48 or any other enumerated embodiment, wherein the microprocessor at least in part controls one or more of a process chosen from:
cutting the frame precursor structure to a predetermined length;
passing the shaped framework material through straightening rollers;
buffing or deburring the shaped framework material; and
forming a raised rim structure feature.

Enumerated embodiment 50. The method of enumerated embodiment 48 or 49 or any other enumerated embodiment, wherein the microprocessor receives sensor data from one or more sensors.

Enumerated embodiment 51. The method of enumerated embodiment 50 or any other enumerated embodiment, wherein the microprocessor processes the sensor data to generate information about manufacturing status or quality control.

Enumerated embodiment 52. The method of enumerated embodiment 50 or 51 or any other enumerated embodiment, wherein the microprocessor sends the sensor data or the information to another microprocessor.

Enumerated embodiment 53. The method according to any of enumerated embodiments 50-52 or any other enumerated embodiment, wherein the sensor data or information is used to change a process parameter.

Enumerated embodiment 54. The method according to any of enumerated embodiments 48-53 or any other enumerated embodiment, wherein the microprocessor includes, or is in communication with, a computer readable memory including software that is read by logic circuitry within the microprocessor and used to control at least in part one or more of the processes.

Enumerated embodiment 55. A microprocessor including logic circuitry and a computer readable memory, the computer readable memory including software that is used by the logic circuitry to control, at least in part, one or more processes according to any of enumerated embodiments 42-54 or any other enumerated embodiment.

Enumerated embodiment 56. A frame for supporting a solar panel, the frame including at least a first frame section including:
- a bottom flange provided at a base of the first frame section;
- a frame sidewall provided at an outer portion of the first frame section, the frame sidewall including a height extending from the bottom flange;
- a panel containment structure at an upper portion of the frame sidewall, the panel containment structure including a lower shelf extending from the sidewall; and
- one or more frame alignment structures provided in the bottom flange, in the frame sidewall, or both in the bottom flange and in the frame sidewall,
- wherein the bottom flange, frame sidewall, and panel containment structure are formed at least in part from folds provided in a single piece of first framework material.

Enumerated embodiment 57. The frame of enumerated embodiment 56 or any other enumerated embodiment, wherein the frame alignment structure includes:
- a first layer of first framework material including an alignment opening; and
- a second layer of first framework material proximate the first layer of framework material and including one or more push-in features extending into the alignment opening.

Enumerated embodiment 58. The frame of enumerated embodiment 57 or any other enumerated embodiment, wherein the one or more push-in features are folded over a portion of the first layer of first framework material.

Enumerated embodiment 59. The frame of enumerated embodiment 57 or 58 or any other enumerated embodiment, wherein one or more of the push-in features includes a tab structure.

Enumerated embodiment 60. The frame according to any of enumerated embodiments 57-59 or any other enumerated embodiment, wherein the alignment opening includes one or more notches.

Enumerated embodiment 61. The frame according to any of enumerated embodiments 57-60 or any other enumerated embodiment, further including a support wall extending between the panel containment structure and the bottom flange.

Enumerated embodiment 62. The frame of enumerated embodiment 61 or any other enumerated embodiment, wherein the support wall includes one or more frame alignment structures.

Enumerated embodiment 63. The frame according to any of enumerated embodiments 56-62 or any other enumerated embodiment, wherein at least one frame alignment structure includes a reinforced mounting hole.

Enumerated embodiment 64. The frame according to any of enumerated embodiments 56-63 or any other enumerated embodiment, wherein at least one frame alignment structure includes a locking feature between adjacent layers of framework material.

Enumerated embodiment 65. The frame according to any of enumerated embodiments 56-64 or any other enumerated embodiment, wherein the first framework material includes coated steel.

Enumerated embodiment 66. The frame of enumerated embodiment 65 or any other enumerated embodiment, wherein the coated steel has an average thickness in a range of about 0.7 mm to about 1.4 mm.

Enumerated embodiment 67. A frame for supporting a solar panel, the frame including at least a first frame section including:
- a bottom flange provided at a base of the first frame section;
- a frame sidewall provided at an outer portion of the first frame section, the frame sidewall including a height extending from the bottom flange;
- a panel containment structure at an upper portion of the frame sidewall, the panel containment structure including a lower shelf extending from the sidewall; and
- a support wall extending between the panel containment structure and the bottom flange;
- wherein the support wall includes a reinforced mounting hole, a reinforced access hole, or a frame alignment structure, and
- wherein the bottom flange, frame sidewall, panel containment structure, and support wall are formed at least in part from folds provided in a single piece of first framework material.

Enumerated embodiment 68. The frame of enumerated embodiment 67 or any other enumerated embodiment, wherein the reinforced mounting hole or reinforced access hole includes a first layer of framework material including a first-layer opening, and a second layer of framework material including a second-layer opening in functional alignment with the first-layer opening.

Enumerated embodiment 69. The frame of enumerated embodiment 67 or 68 or any other enumerated embodiment, wherein at least one reinforced mounting hole or reinforced access hole includes a raised rim structure at least partially around a perimeter of the opening.

Enumerated embodiment 70. The frame of enumerated embodiment 69 or any other enumerated embodiment, wherein the raised rim structure further includes a taper.

Enumerated embodiment 71. The frame of enumerated embodiment 69 or 70 or any other enumerated embodiment, wherein the raised rim structure is formed of the first framework material.

Enumerated embodiment 72. The frame according to any of enumerated embodiments 67-71 or any other enumerated embodiment, wherein the reinforced mounting hole or reinforced access hole includes:
- a first layer of the first framework material including a first layer opening;
- a second layer of the first framework material including a second layer opening in functional alignment with the first layer opening; and
- a raised rim structure at least partially around a perimeter the first layer opening.

Enumerated embodiment 73. The frame of enumerated embodiment 72 or any other enumerated embodiment, wherein the raised rim structure is formed at least in part from the second layer of the first framework material which extends through the first layer opening.

Enumerated embodiment 74. The frame of enumerated embodiment 72 or 73 or any other enumerated embodiment, wherein the raised rim structure is formed at least in part from the first layer of the first framework material.

Enumerated embodiment 75. The frame according to any of enumerated embodiments 72-74 or any other enumerated embodiment, wherein the raised rim structure further includes a taper.

Enumerated embodiment 76. The frame of enumerated embodiment 67 or any other enumerated embodiment, wherein the frame alignment structure includes:
- a first layer of first framework material including an alignment opening; and
- a second layer of first framework material proximate the first layer of framework material and including one or more push-in features extending into the alignment opening.

Enumerated embodiment 77. The frame of enumerated embodiment 76 or any other enumerated embodiment, wherein the one or more push-in features are folded over a portion of the first layer of first framework material.

Enumerated embodiment 78. The frame of enumerated embodiment 76 or 77 or any other enumerated embodiment, wherein one or more of the push-in features includes a tab structure.

Enumerated embodiment 79. The frame according to any of enumerated embodiments 76-78 or any other enumerated embodiment, wherein the alignment opening includes one or more notches.

Enumerated embodiment 80. The frame of enumerated embodiment 1 or any other enumerated embodiment, wherein the average thickness comprises a thickness between about 0.7 mm to about 1.4 mm.

Enumerated embodiment 81. The frame of enumerated embodiment 24 or any other enumerated embodiment, wherein the average thickness comprises a thickness between about 0.7 mm to about 1.4 mm.

Enumerated embodiment 82. The frame of enumerated embodiment 1 or any other enumerated embodiment, wherein the reinforced mounting holes in the bottom flange, in the frame sidewall, or both in the bottom flange and in the frame sidewall comprise an opening having a depth that is greater than said average thickness of said first framework material.

Enumerated embodiment 83. The frame of enumerated embodiment 27 or any other enumerated embodiment, wherein the reinforced mounting holes in the second frame comprise an opening having a depth that is greater than said average thickness of said second framework material.

As can be easily understood from the foregoing, the basic concepts of the various embodiments of the present application(s) may be embodied in a variety of ways. It involves frame, frame precursor structure, frame section, framed panel structure and/or mounting technology techniques as well as devices to accomplish the appropriate frame, frame precursor structure, frame section, framed panel structure, and/or mounting technology. In this application, the frame, frame precursor structure, frame section, framed panel structure and/or mounting technology techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the various embodiments of the present application(s) and may not explicitly show how each feature or element can actually be representative of a broader function or of a great variety of alternative or equivalent elements. As one example, terms of degree, terms of approximation, and/or relative terms may be used. These may include terms such as the words: substantially, about, only, and the like. These words and types of words are to be understood in a dictionary sense as terms that encompass an ample or considerable amount, quantity, size, etc. as well as terms that encompass largely but not wholly that which is specified. Further, for this application if or when used, terms of degree, terms of approximation, and/or relative terms should be understood as also encompassing more precise and even quantitative values that include various levels of precision and the possibility of claims that address a number of quantitative options and alternatives. For example, to the extent ultimately used, the existence or non-existence of a substance or condition in a particular input, output, or at a particular stage can be specified as substantially only x or substantially free of x, as a value of about x, or such other similar language. Using percentage values as one example, these types of terms should be understood as encompassing the options of percentage values that include 99.5%, 99%, 97%, 95%, 92% or even 90% of the specified value or relative condition; correspondingly for values at the other end of the spectrum (e.g., substantially free of x, these should be understood as encompassing the options of percentage values that include not more than 0.5%, 1%, 3%, 5%, 8% or even 10% of the specified value or relative condition, all whether by volume or by weight as either may be specified. In context, these should be understood by a person of ordinary skill as being disclosed and included whether in an absolute value sense or in valuing one set of or substance as compared to the value of a second set of or substance. Again, these are implicitly included in this disclosure and should (and, it is believed, would) be understood to a person of ordinary skill in this field. Where the application is described in device-oriented terminology, each element of the device implicitly performs a function. Apparatus claims may not only be included for the device described, but also method or process claims may be included to address the functions of the embodiments and that each element performs. Neither the description nor the terminology is intended to limit the scope of the claims that will be included in any subsequent patent application. As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth. Terms like "overlaying", "over" or the like may be direct contact, indirect contact, above, upon, cover, or the like.

It should also be understood that a variety of changes may be made without departing from the essence of the various embodiments of the present application(s). Such changes are also implicitly included in the description. They still fall within the scope of the various embodiments of the present application (s). A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of embodiments of the present application (s) both independently and as an overall system.

Further, each of the various elements of embodiments of the present application (s) and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the various embodiments of the present application (s), the words for each element may be expressed by equivalent apparatus terms or method terms— even if only the function or result is the same. Such equivalent, broader, or even more generic terms should be considered to be encompassed in the description of each element or action. Such terms can be substituted where desired to make explicit the implicitly broad coverage to which embodiments of the present application (s) are entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "fold" should be understood to encompass disclosure of the act of "folding"—whether explicitly discussed or not—and, conversely, were there effectively disclosure of the act of "folding", such a disclosure should be understood to encompass disclosure of a "fold" and even a "means for folding." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function. As other non-limiting examples, it should be understood that claim elements can also be expressed as any of: components that are configured to, or configured and arranged to, achieve a particular result, use, purpose, situation, function, or operation, or as components that are capable of achieving a particular result, use, purpose, situation, function, or operation. All should be understood as within the scope of this disclosure and written description.

Any patents, publications, or other references mentioned in this present application for patent are hereby incorporated by reference. Any priority case(s) claimed by this present application is hereby appended and hereby incorporated by reference. In addition, as to each term used it should be understood that unless its utilization in this present application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any list of references or other information statement filed with the application are hereby appended and hereby incorporated by reference, however, as to each of the above, to the extent that such information or statements incorporated by reference might be considered inconsistent with the patenting of the various embodiments of present application(s) such statements are expressly not to be considered as made by the applicant(s).

Thus, the applicant(s) should be understood to have support and make claims to embodiments including at least: i) each of the frame, frame precursor structure, frame section, framed panel structure, and/or mounting technologies as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent applications, vii) the applications enhanced by the various systems or components disclosed, viii) the resulting products produced by such processes, methods, systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all applications described herein.

In addition and as to computer aspects and each aspect amenable to programming or other electronic automation, it should be understood that in characterizing these and all other aspects of the various embodiments of the present application(s)—whether characterized as a device, a capability, an element, or otherwise, because all of these can be implemented via software, hardware, or even firmware structures as set up for a general purpose computer, a programmed chip or chipset, an ASIC, application specific controller, subroutine, or other known programmable or circuit specific structure—it should be understood that all such aspects are at least defined by structures including, as person of ordinary skill in the art would well recognize: hardware circuitry, firmware, programmed application specific components, and even a general purpose computer programmed to accomplish the identified aspect. For such items implemented by programmable features, the applicant(s) should be understood to have support to claim and make a statement of application to at least: xv) processes performed with the aid of or on a computer, machine, or computing machine as described throughout the above discussion, xvi) a programmable apparatus as described throughout the above discussion, xvii) a computer readable memory encoded with data to direct a computer comprising means or elements which function as described throughout the above discussion, xviii) a computer, machine, or computing machine configured as herein disclosed and described, xix) individual or combined subroutines and programs as herein disclosed and described, xx) a carrier medium carrying computer readable code for control of a computer to carry out separately each and every individual and combined method described herein or in any claim, xxi) a computer program to perform separately each and every individual and combined method disclosed, xxii) a computer program containing all and each combination of means for performing each and every individual and combined step disclosed, xxiii) a storage medium storing each computer program disclosed, xxiv) a signal carrying a computer program disclosed, xxv) a processor executing instructions that act to achieve the steps and activities detailed, xxvi) circuitry configurations (including configurations of transistors, gates, and the like) that act to sequence and/or cause actions as detailed, xxvii) computer readable medium(s) storing instructions to execute the steps and cause activities detailed, xxviii) the related methods disclosed and described, xxix) similar, equivalent, and even implicit variations of each of these systems and methods, xxx) those alternative designs which accomplish each of the functions shown as are disclosed and described, xxxi) those alternative designs and methods which accomplish each of the functions shown as are implicit to accomplish that which is disclosed and described, xxxii) each feature, component, and step shown as separate and independent applications, and xxxiii) the various combinations of each of the above and of any aspect, all without limiting other aspects in addition. In addition, the applicant(s) should be understood to have support to claim and make a statement of application that may include claims directed to any of the enumerated embodiments and any permutation or combination thereof.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this present application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 2, or even claim 5 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of various embodiments of the present application, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as desired to define the matter for which protection is sought by this present application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this present application including any subsequent continuation, division, or continuation-in-part application thereof or any reissue or extension thereon.

We claim:

1. A frame for supporting a solar panel, the frame comprising at least a first frame section comprising:
   a bottom flange provided at a base of the first frame section;
   a frame sidewall provided at an outer portion of the first frame section, the frame sidewall comprising a height extending from the bottom flange;
   a panel containment structure at an upper portion of the frame sidewall, the panel containment structure comprising a lower shelf extending from the sidewall; and
   one or more reinforced mounting holes provided in the bottom flange, in the frame sidewall, or both in the bottom flange and in the frame sidewall, wherein the bottom flange, frame sidewall, and panel containment structure are formed at least in part from folds provided in a single piece of first framework material, the first framework material comprising an average thickness, wherein the one or more reinforced mounting holes comprise an opening having a depth greater than the framework thickness, wherein at least one of the one or more reinforced mounting holes comprises a first layer of framework material and a second layer of framework material, wherein the first layer of framework material comprises a first layer opening, and wherein the second layer of framework material comprises a second-layer opening in functional alignment with the first-layer opening, and wherein the at least one or more reinforced mounting hole is provided in the bottom flange and wherein the first layer or second layer is formed from a reversing flange fold.

2. The frame of claim 1, wherein the at least one reinforced mounting hole comprises a third layer of framework material comprising a third-layer opening in functional alignment with the first- and second-layer openings.

3. The frame of claim 1, wherein the at least one reinforced mounting hole is provided in the bottom flange and wherein the first layer and second layer are formed from other than a reversing flange fold.

4. The frame of claim 1, further comprising a reinforced mounting hole provided in the frame sidewall.

5. The frame of claim 1 wherein the at least one reinforced mounting hole is provided in the frame sidewall.

6. The frame of claim 1, wherein at least one of the one or more reinforced mounting holes comprises a raised rim structure at least partially around a perimeter of the opening.

7. The frame of claim 6, wherein the raised rim structure further comprises a taper.

8. The frame of claim 6, wherein the raised rim structure is formed of the first framework material.

9. The frame of claim 1, wherein at least one of the one or more reinforced mounting hole comprises:
a first layer of the first framework material comprising a first layer opening;
a second layer of the first framework material comprising a second layer opening in functional alignment with the first layer opening; and
a raised rim structure at least partially around a perimeter the first layer opening.

10. The frame of claim 9, wherein the raised rim structure is formed at least in part from the second layer of the first framework material which extends through the first layer opening.

11. The frame of claim 9, wherein the raised rim structure is formed at least in part from the first layer of the first framework material.

12. The frame of claim 9, wherein the raised rim structure further comprises a taper.

13. The frame of claim 1, further comprising a support wall extending between the panel containment structure and the bottom flange.

14. The frame of claim 13, wherein the support wall comprises one or more reinforced mounting holes.

15. The frame of claim 1, wherein the first framework material comprises coated steel.

16. A framed panel structure comprising a frame of claim 1 and a solar panel provided in association with the panel containment structure of the first frame section.

17. A mounting system comprising a support structure and the framed panel structure of claim 16, wherein the frame is attached to the support structure using one or more of the reinforced mounting holes.

18. The mounting system of claim 17, further comprising an attachment feature.

19. The mounting system of claim 18, wherein the attachment feature is chosen from a bolt, a flange bolt, a nut, a neo bolt, a lock bolt, a clinch, and a rivet.

20. The mounting system of claim 18, wherein the attachment feature is part of the support structure.

21. A frame for supporting a solar panel, the frame comprising at least a first frame section comprising:
a bottom flange provided at a base of the first frame section;
a frame sidewall provided at an outer portion of the first frame section, the frame sidewall comprising a height extending from the bottom flange;
a panel containment structure at an upper portion of the frame sidewall, the panel containment structure comprising a lower shelf extending from the sidewall; and
one or more reinforced mounting holes provided in the bottom flange, in the frame sidewall, or both in the bottom flange and in the frame sidewall,
wherein the bottom flange, frame sidewall, and panel containment structure are formed at least in part from folds provided in a single piece of first framework material, the first framework material comprising an average thickness,
wherein the one or more reinforced mounting holes comprise an opening having a depth greater than the framework thickness,
wherein at least one of the one or more reinforced mounting holes comprises a raised rim structure at least partially around a perimeter of the opening, and
wherein the raised rim structure further comprises a taper.

22. A frame for supporting a solar panel, the frame comprising at least a first frame section comprising:
a bottom flange provided at a base of the first frame section;
a frame sidewall provided at an outer portion of the first frame section, the frame sidewall comprising a height extending from the bottom flange;
a panel containment structure at an upper portion of the frame sidewall, the panel containment structure comprising a lower shelf extending from the sidewall; and
one or more reinforced mounting holes provided in the bottom flange, in the frame sidewall, or both in the bottom flange and in the frame sidewall,
wherein the bottom flange, frame sidewall, and panel containment structure are formed at least in part from folds provided in a single piece of first framework material, the first framework material comprising an average thickness,
wherein the one or more reinforced mounting holes comprise an opening having a depth greater than the framework thickness,
wherein at least one of the one or more reinforced mounting hole comprises:
a first layer of the first framework material comprising a first layer opening;
a second layer of the first framework material comprising a second layer opening in functional alignment with the first layer opening; and
a raised rim structure at least partially around a perimeter the first layer opening, and wherein the raised rim structure is formed at least in part from the second layer of the first framework material which extends through the first layer opening.

23. A frame for supporting a solar panel, the frame comprising at least a first frame section comprising:
   a bottom flange provided at a base of the first frame section;
   a frame sidewall provided at an outer portion of the first frame section, the frame sidewall comprising a height extending from the bottom flange;
   a panel containment structure at an upper portion of the frame sidewall, the panel containment structure comprising a lower shelf extending from the sidewall; and
   one or more reinforced mounting holes provided in the bottom flange, in the frame sidewall, or both in the bottom flange and in the frame sidewall,
   wherein the bottom flange, frame sidewall, and panel containment structure are formed at least in part from folds provided in a single piece of first framework material, the first framework material comprising an average thickness,
   wherein the one or more reinforced mounting holes comprise an opening having a depth greater than the framework thickness,
   wherein at least one of the one or more reinforced mounting hole comprises:
      a first layer of the first framework material comprising a first layer opening;
      a second layer of the first framework material comprising a second layer opening in functional alignment with the first layer opening; and
      a raised rim structure at least partially around a perimeter of the first layer opening, and
   wherein the raised rim structure is formed at least in part from the first layer of the first framework material.

* * * * *